(12) United States Patent
Gonzalez Franco et al.

(10) Patent No.: US 10,838,486 B2
(45) Date of Patent: Nov. 17, 2020

(54) VIRTUAL REALITY CONTROLLER

(71) Applicant: Microsoft Technology Licensing, LLC, Redmond, WA (US)

(72) Inventors: Mar Gonzalez Franco, Seattle, WA (US); Eyal Ofek, Redmond, WA (US); Michael J. Sinclair, Kirkland, WA (US); Christian Holz, Seattle, WA (US); Jaeyeon Lee, Daejeon (KR)

(73) Assignee: Microsoft Technology Licensing, LLC, Redmond, WA (US)

(*) Notice: Subject to any disclaimer, the term of this patent is extended or adjusted under 35 U.S.C. 154(b) by 0 days.

(21) Appl. No.: 16/289,327

(22) Filed: Feb. 28, 2019

(65) Prior Publication Data

US 2020/0278740 A1    Sep. 3, 2020

(51) Int. Cl.
| | |
|---|---|
| *G06F 3/0354* | (2013.01) |
| *G06F 3/01* | (2006.01) |
| *G06F 3/044* | (2006.01) |
| *G06F 3/0484* | (2013.01) |

(52) U.S. Cl.
CPC .............. *G06F 3/011* (2013.01); *G06F 3/016* (2013.01); *G06F 3/03547* (2013.01); *G06F 3/044* (2013.01); *G06F 3/04845* (2013.01)

(58) Field of Classification Search
CPC .......... G06F 3/011; G06F 3/016; G06F 3/044; G06F 3/03547; G06F 3/04845
See application file for complete search history.

(56) References Cited

U.S. PATENT DOCUMENTS

| | | | |
|---|---|---|---|
| 10,198,086 B2 | 2/2019 | Parazynski et al. | |
| 2005/0128186 A1* | 6/2005 | Shahoian | A63F 13/06 345/161 |
| 2008/0150891 A1 | 6/2008 | Berkley et al. | |

(Continued)

FOREIGN PATENT DOCUMENTS

| | | |
|---|---|---|
| EP | 2422939 B9 | 10/2013 |
| JP | 2008176779 A | 7/2008 |

(Continued)

OTHER PUBLICATIONS

"CyberGrasp", Retrieved from: <<https://www.upc.edu/sct/documents_equipament/d_184_id-485.pdf>>, Dec. 2007, 30 Pages.

(Continued)

*Primary Examiner* — Robert J Michaud
(74) *Attorney, Agent, or Firm* — Rainier Patents, P.S.

(57) ABSTRACT

The present concepts relate to a virtual reality controller that enables fine control of virtual objects using natural motions involving the dexterity of the user's fingers and provides realistic haptic sensations to the user's fingers. The controller may have a rigid structure design without moving parts. Force sensors under finger rests can detect forces exerted by user's fingers. Actuators can render haptic feedback from the virtual reality world to the user's fingers. The controller may include one or more trackpads on which the user may slide her fingers. The controller may be used for exploring and manipulating virtual objects, for example, by grasping, releasing, rotating, and feeling the surface of virtual objects.

20 Claims, 14 Drawing Sheets

(56) References Cited

U.S. PATENT DOCUMENTS

| | | | | |
|---|---|---|---|---|
| 2011/0118753 | A1* | 5/2011 | Itkowitz | G06F 3/014 606/130 |
| 2016/0239080 | A1* | 8/2016 | Marcolina | G06F 3/011 |
| 2018/0314406 | A1 | 11/2018 | Powderly et al. | |
| 2018/0314416 | A1* | 11/2018 | Powderly | G06F 3/02 |

FOREIGN PATENT DOCUMENTS

| | | | |
|---|---|---|---|
| WO | 2012048325 | A2 | 4/2012 |
| WO | 2018055352 | A1 | 3/2018 |

OTHER PUBLICATIONS

"VRgluv Added to Groundbreakers Innovation Index by Atlanta Magazine", Retrieved from <<https://vrgluv.com/>>, Sep. 24, 2018, 8 Pages.

Adams, et al."Finger Pad Friction and its Role in Grip and Touch", In Journal of the Royal Society interface ,vol. 10, Issue 80, Mar. 6, 2013, pp. 1-19.

Ben, Lang"Hands-on: Reactive Grip Haptic Controller Prototype with Vive Tracker, Touch, and Custom SteamVR Tracking", Retrieved from <<https://www.roadtovr.com/hands-on-tactical-haptics-reactive-grip-haptic-controller-prototype-with-vive-tracker-touch-and-custom-steamvr-tracking/>>, Mar. 4, 2017, 4 Pages.

Benko, et al."NormalTouch and TextureTouch: High-fidelity 3D Haptic Shape Rendering on Handheld Virtual Reality Controllers", In Proceedings of the 29th Annual Symposium on User Interface Software and Technology, Oct. 16, 2016, pp. 717-728.

Berger, et al."Expanding the Sense of Touch Outside the Body", In Proceedings of the 15th ACM Symposium on Applied Perception, Aug. 10, 2018, 9 Pages.

Berger, et al."The uncanny valley of Haptics", In Journal of Science Robotics, vol. 3, Apr. 18, 2018, 13 Pages.

Bitiner, et al."VersaPatch: A Low Cost 2.5D Capacitive Touch Sensor", In Proceedings of the 13th International Conference on Human-Computer Interaction, Part II: Novel Interaction Methods and Techniques, Jul. 19, 2009, 11 Pages.

Bullion, et al."Haptic Glove with MR Brakes for Distributed Finger Force Feedback", In Journal of Presence, vol. 18, Issue 6, Dec. 1, 2009.

Chinello, et al."A Three Revolute-Revolute-Spherical wearable fingertip cutaneous device for stiffness rendering", In Journal of IEEE Transactions on Haptics, vol. 11, Issue 1, Jan. 2018, pp. 1-12.

Choi, et al."CLAW: A Multifunctional Handheld Haptic Controller for Grasping, Touching, and Triggering in Virtual Reality", In Proceedings of the CHI Conference on Human Factors in Computing Systems, Apr. 21, 2018, 13 Pages.

Choi, et al."Grabity: A Wearable Haptic Interface for Simulating Weight and Grasping in Virtual Reality", In Proceedings of 30th Annual ACM Symposium on User Interface Software and Technology, Oct. 22, 2017, pp. 119-130.

Choi, et al."Wolverine: A wearable haptic interface for grasping in virtual reality", In Proceedings of IEEE/RSJ International Conference on Intelligent Robots and Systems, Oct. 9, 2016, 8 Pages.

Culbertson, et al."Modeling and Rendering Realistic Textures from Unconstrained Tool-Surface Interactions", In Journal of IEEE Transactions on Haptics, vol. 7, Issue 3, Apr. 11, 2014, pp. 381-393.

Culbertson, et al."Should Haptic Texture Vibrations Respond to user Force and Speed?", In Proceedings of the IEEE World Haptics Conference, Jun. 22, 2015, pp. 106-112.

Cutkosky, Mark R."On Grasp Choice, Grasp Models, and the Design of Hands for Manufacturing Tasks", In Journal of IEEE Transactions on Robotics and Automation, vol. 5, issue 3, Jun. 1989, pp. 269-279.

Dellon, et al."Prosthetics, Exoskeletons, and Rehabilitation [Grand Challenges of Robotics]", In Journal of IEEE Robotics & Automation Magazine ,vol. 14, issue 1, Mar. 2007, pp. 30-34.

Feix, et al."The GRASP Taxonomy of Human Grasp Types", In Journal IEEE Transactions on Human-Machine Systems vol. 46, Issue 1, Feb. 2016, pp. 66-77.

Franco, et al."Model of illusions and Virtual Reality", In Journal of Frontiers in Psychology, vol. 8, Jun. 30, 2017, pp. 1-8.

Girard, et al."HapTip: Displaying Haptic Shear Forces at the Fingertips for Multi-Finger Interaction in Virtual Environments", In Journal of Frontiers in ICT, vol. 3, Issue 6, Apr. 22, 2016, pp. 1-15.

Hinchet, et al."DextrES: Wearable Haptic Feedback for Grasping in VR via a Thin Form-Factor Electrostatic Brake", In Proceedings of the 31st Annual ACM Symposium on User Interface Software and Technology, Oct. 14, 2018, 12 Pages.

Holz, et al."Haptic Links: Bimanual Haptics for Virtual Reality Using Variable Stiffness Actuation", In Proceedings of the CHI Conference on Human Factors in Computing Systems, Apr. 21, 2018, 12 Pages.

In, et al."Exo-Glove: A Wearable Robot for the Hand with a Soft Tendon Routing System", In Journal of IEEE Robotics & Automation Magazine, vol. 22, Issue 1, Mar. 13, 2015, pp. 97-105.

In, et al."Jointless Structure and Under-Actuation Mechanism for Compact Hand Exoskeleton", In Proceedings of IEEE International Conference on Rehabilitation Robotics, Jun. 29, 2011, 6 Pages.

"Behold the Next Generation VR Technology: Part 7—Controllers and Haptics", Retrieved from <<https://medium.com/@spammaleros/behold-the-generation-vr-technology-part-7-controllers-and-haptics-3243e8399d29>>, Apr. 7, 2018, 8 Pages.

Kildal, Johan"Tangible 3D Haptics on Touch Surfaces: Virtual Compliance", In Proceedings of the international Conference on Human Factors in Computing Systems, May 7, 2011, 7 Pages.

Kim, et al."Combining Point Force Haptic and Pneumatic Tactile Displays", In Proceedings of the EuroHaptics, Jul. 2006, 8 Pages.

Kim, et al."HapCube: A Wearable Tactile Device to Provide Tangential and Normal Pseudo-Force Feedback on a Fingertip", In Proceedings of the CHI Conference on Human Factors in Computing Systems, Apr. 21, 2018, pp. 1-13.

Kim, et al."HapThimble: A Wearable Haptic Device towards Usable Virtual Touch Screen", In Proceedings of the CHI Conference on Human Factors in Computing Systems, May 7, 2016, pp. 3694-3705.

Kim, et al."SaLT: Small and lightweight tactile display using ultrasonic actuators", In Proceedings of 17th IEEE International Symposium on Robot and Human Interactive Communication, Aug. 1, 2008, pp. 430-435.

Klatzky, et al."Intelligent Exploration by the Human Hand", In Publication of Dextrous Robot Hands, Jan. 1990, pp. 66-81.

Koo, et al."Development of Hand Exoskeleton using Pneumatic Artificial Muscle Combined with Linkage", In Journal of the Korean Society for Precision Engineering, vol. 30, Issue 11, Nov. 1, 2013, 4 Pages.

Lecuyer, Anatole"Playing with Senses in VR: Alternate Perceptions Combining Vision and Touch", In Journal of IEEE Computer Graphics and Applications, vol. 37, Issue 1, Jan. 16, 2017, pp. 20-26.

Machkovech, Sam"Valve Revamps its Next Controller, Should Make using Hands in VR Feel Way Cooler [Updated]", Retrieved from <<https://arstechnica.com/gaming/2018/06/valve-revamps-its-next-controller-should-make-using-hands-in-vr-feel-way-cooler/>>, Jun. 23, 2018, 5 Pages.

Mackenzie, et al."The Grasping Hand", In Publication of Elsevier, vol. 104, Feb. 3, 1994.

Minamizawa, et al."Gravity Grabber: Wearable Haptic Display to Present Virtual Mass Sensation", In ACM SIGGRAPH emerging technologies, Aug. 5, 2007, 4 Pages.

Okamura, et al."An Overview of Dexterous Manipulation", In Proceedings of IEEE International Conference on Robotics and Automation, Apr. 24, 2000, pp. 255-262.

Gonzalez-Franco, et al."Avatar Embodiment. Towards a Standardized Questionnaire", In Journal of Frontiers in Robotics and AI, vol. 5, Jun. 22, 2018, pp. 1-9.

Peterson, et al."Economic Valuation by the Method of Paired Comparison, with Emphasis on Evaluation of the Transitivity Axiom", In Journal of Land Economics,vol. 74, Issue 02, May 1998, pp. 240-261.

(56) References Cited

OTHER PUBLICATIONS

Provancher, et al."Contact Location Display for Haptic Perception of Curvature and Object Motion", In Journal of Robotics Research, vol. 24, Issue 09, Sep. 1, 2005, pp. 691-702.

Rekimoto, Jun"Traxion: A tactile interaction device with virtual force sensation", In Proceedings of the 26th annual ACM Symposium on User Interface Software and Technology, Oct. 8, 2013, pp. 427-431.

Sarakoglou, et al."A Portable Fingertip Tactile Feedback Array—Transmission System Reliability and Modelling", In Proceedings of First Joint Eurohaptics Conference and Symposium on Haptic Interfaces for Virtual Environment and Teleoperator Systems, Mar. 18, 2005, 2 Pages.

Schorr, et al."Fingertip Tactile Devices for Virtual Object Manipulation and Exploration", In Proceedings of the CHI Conference on Human Factors in Computing Systems, May 6, 2017, pp. 3115-3119.

Scott, Hayden"Microsoft Shows New Research in Haptics With 'CLAW' VR Controller Prototype", Retrieved from <<https://www.roadtovr.com/microsoft-shows-new-research-haptics-claw-vr-controller-prototype/>>, Mar. 13, 2018, 3 Pages.

Son, et al."Haptic Feedback to the Palm and Fingers for improved Tactile Perception of Large Objects", In Proceedings of the 31st Annual ACM Symposium on User Interface Software and Technology, Oct. 14, 2018, pp. 757-763.

Thorn, et al."Assessing 3D Scan Quality Through Paired-comparisons Psychophysics", In Proceedings of the 24th ACM international conference on Multimedia, Oct. 15, 2016, pp. 147-151.

Vaesen, et al."The Cognitive Bases of Human Tool use", In Journal of Behavioral and Brain Sciences, vol. 35, Issue 4, Aug. 2012, pp. 203-262.

Victor, et al."Recognizing the Grasp Intention from Human Demonstration", In Journal of Robotics and Autonomous Systems, vol. 74, Jul. 14, 2015, pp. 108-121.

Whitmire, et al."Haptic Revolver: Touch, Shear, Texture, and Shape Rendering on a Reconfigurable Virtual Reality Controller", In Proceedings of the CHI Conference on Human Factors in Computing Systems, Apr. 21, 2018, pp. 1-12.

Yatani, et al."SemFeel: A User Interface with Semantic Tactile Feedback for Mobile Touch-Screen Devices", In Proceedings of the 22nd annual ACM symposium on User interface software and technology, Oct. 4, 2009, pp. 111-120.

Yem, et al."FinGAR: Combination of Electrical and Mechanical Stimulation for High-Fidelity Tactile Presentation", In ACM SIGGRAPH 2016 Emerging Technologies, Jul. 24, 2016, 2 Pages.

Yoshioka, et al."Texture Perception through direct and indirect touch: An Analysis of Perceptual Space for Tactile textures in two Modes of Exploration", In Journal of Somatosensory & Motor Research, vol. 24, Issue 1-2, Jul. 10, 2009, pp. 1-31.

Yun, et al."Exo-Glove PM: An Easily Customizable Modularized Pneumatic Assistive Glove", In Journal of IEEE Robotics and Automation Letters, vol. 2, Issue 3, Jul. 2017, pp. 1725-1732.

Zeller, et al."Motion controllers", Retrieved from <<https://docs.microsoft.com/en-us/windows/mixed-reality/motion-controllers>>, Mar. 21, 2018, 11 Pages.

Gu, et al."Dexmo: An Inexpensive and Lightweight Mechanical Exoskeleton for Motion Capture and Force Feedback in VR", In Proceedings of the CHI Conference on Human Factors in Computing Systems, May 7, 2016, pp. 1991-1995.

"International Search Report and Written Opinion Issued in PCT Application No. PCT/US20/017391", dated Jul. 6, 2020, 16 Pages.

\* cited by examiner

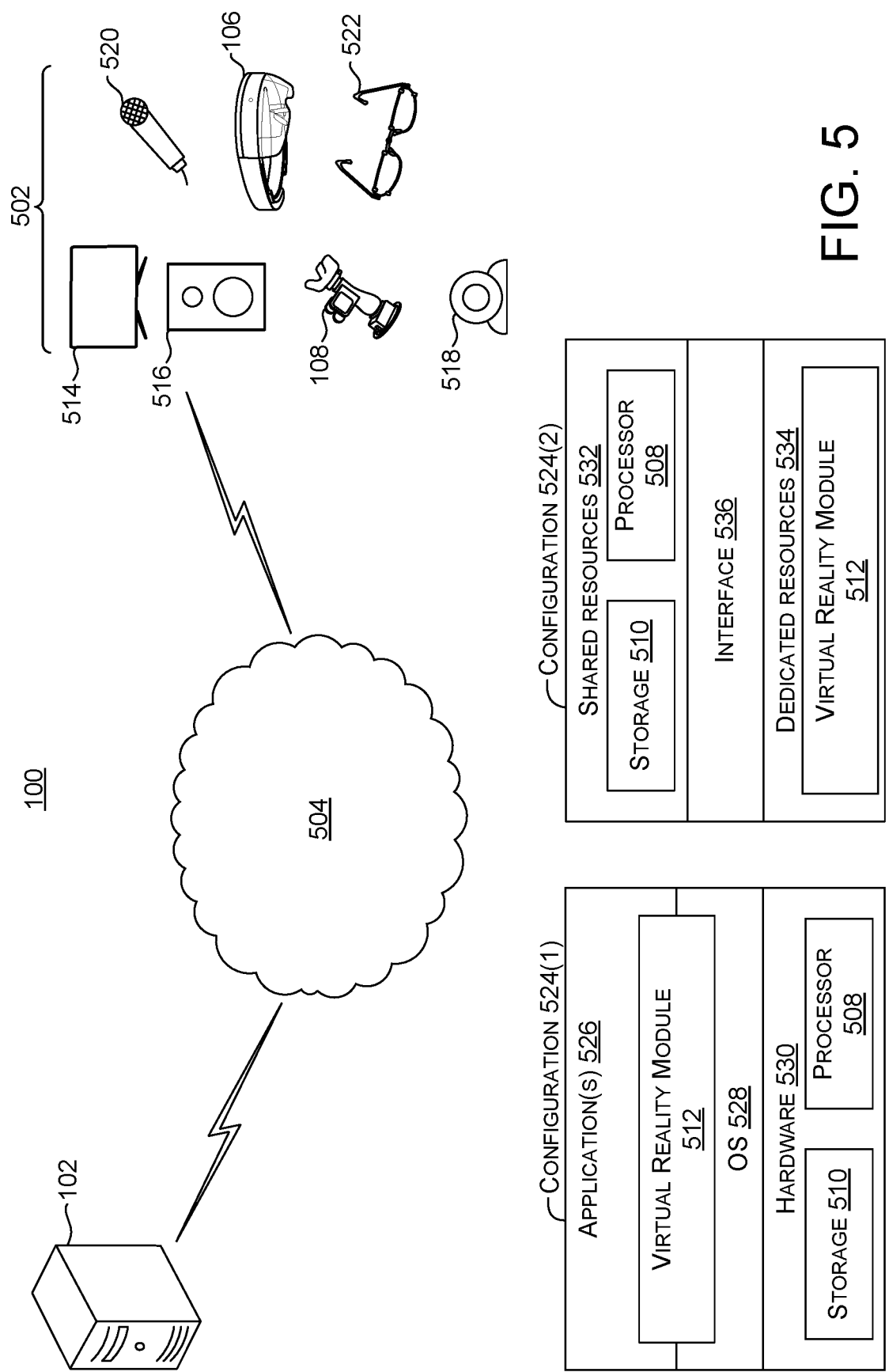

FIG. 6B
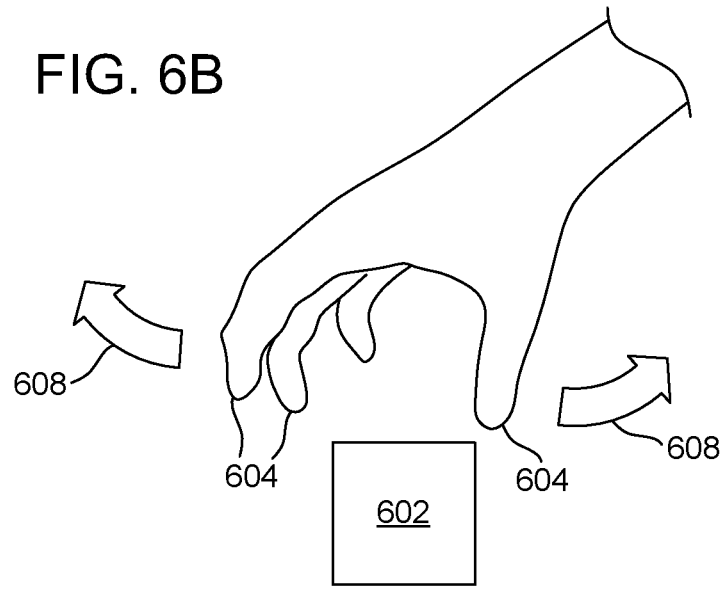
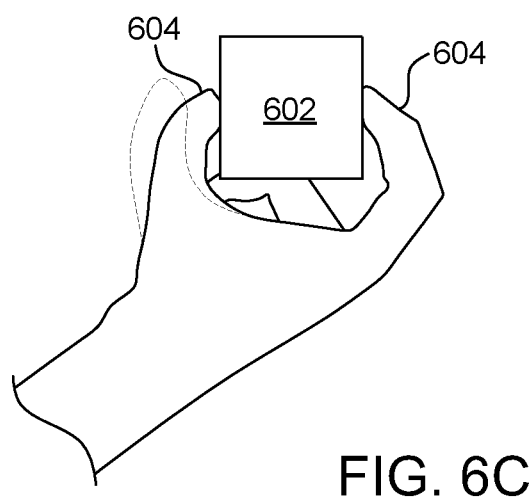
FIG. 6C

VIRTUAL REALITY CONTROLLER

BRIEF DESCRIPTION OF THE DRAWINGS

The accompanying drawings illustrate implementations of the present concepts. Features of the illustrated implementations can be more readily understood by reference to the following descriptions in conjunction with the accompanying drawings. Like reference numbers in the various drawings are used where feasible to indicate like elements. In some cases, parentheticals are utilized after a reference number to distinguish like elements. Use of the reference number without the associated parenthetical is generic to the element. The accompanying drawings are not necessarily drawn to scale. In the figures, the left-most digit of a reference number identifies the figure in which the reference number first appears. The use of similar reference numbers in different instances in the description and the figures may indicate similar or identical items.

FIG. 5 shows block diagrams of example configurations of a virtual reality system, consistent with some implementations of the present concepts.

FIGS. 6A through 6E illustrate virtual renderings of manipulating a virtual object, consistent with some implementations of the present concepts.

DETAILED DESCRIPTION

Figure 1:
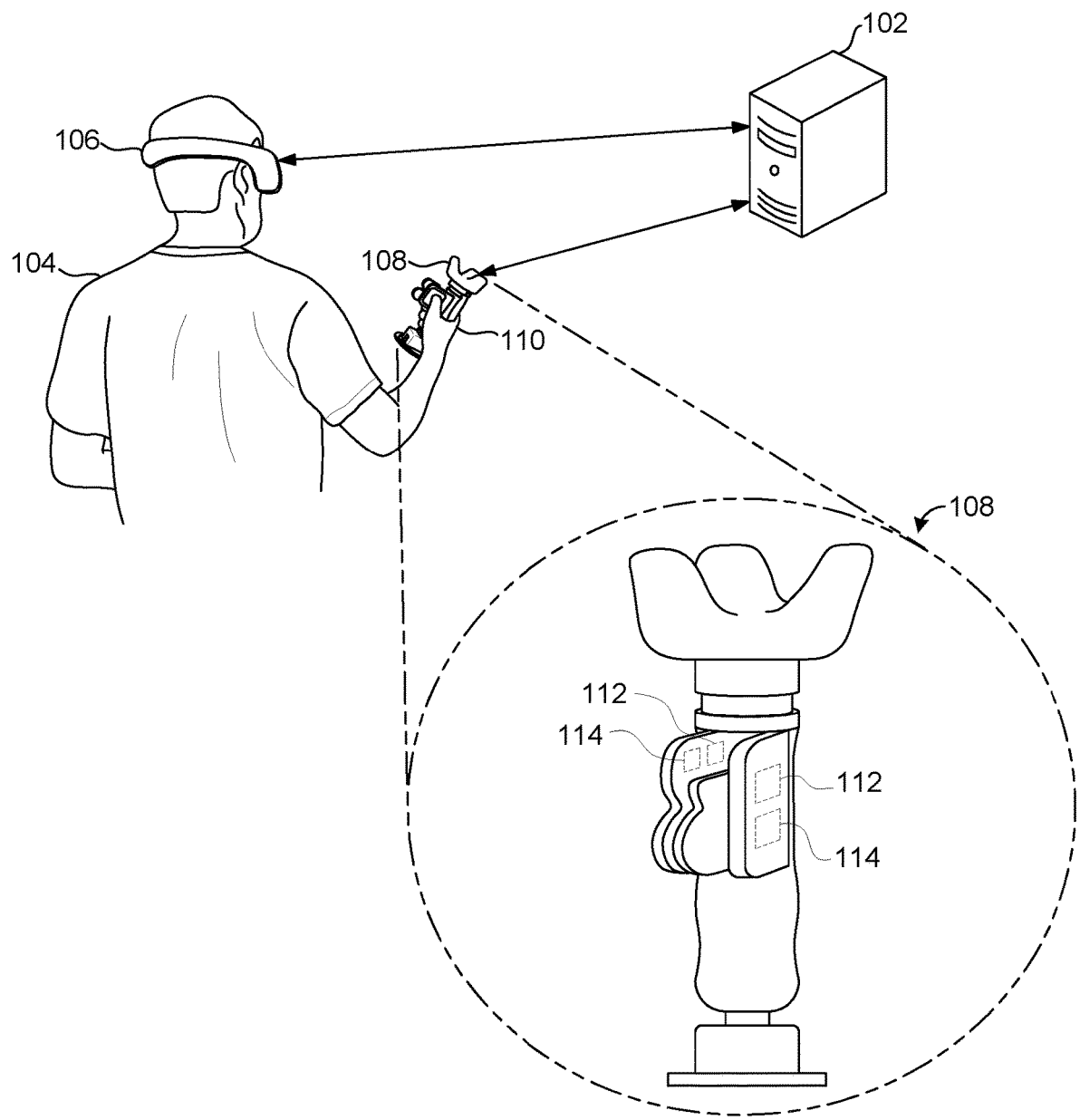
FIG. 1 illustrates a virtual reality system, consistent with some implementations of the present concepts.

The present concepts relate to a controller that can be used in a virtual reality environment (including augmented reality and mixed reality) to simulate natural motions. The controller may be a handheld rigid natural user interface (NUI) that can be used to manipulate virtual objects using fine-grained dexterity manipulations. The controller can also provide a multipurpose tactile experience.

Conventional virtual reality controllers vary greatly in design but have several drawbacks. Typical commercial controllers that are commonly used with video game systems are bulky handheld controllers with joysticks, buttons, and/or triggers. These controllers, however, do not mimic natural motions. Moreover, haptic sensations created by vibrotactile buzzing of the entire controller are underwhelming. These controllers fail to generate compelling forms of haptic feedback including grasping sensations, compliance, and tactile sensations.

Other conventional controllers that mimic natural hand motions can have a relatively simple design and can be held in the user's hand. Such controllers may be gripped using the user's palm (commonly referred to as a power grip) and allow manipulation of virtual objects only through arm and wrist motions. They may not allow the user to use the dexterity of her fingers for finer manipulation of virtual objects as she would in real life.

Other conventional controllers include finger-worn tactile interfaces. Such controllers enable precise touch manipulation and provide realistic dexterous experience derived from cutaneous pressure-sensitive stimulation at the fingertips. However, they have limited forceful input because they have no structure that enables a firm grip by the user's hand.

Conventional glove-like controllers can enable both power grip and high-precision manipulation. Such controllers require haptic rigidity to simulate a power grip or touching of virtual objects. Accordingly, they may include many electromagnetic motors and brakes to provide realistic sensations. Therefore, such controllers are very complex, which drives up cost and reduces reliability. These controllers may have an array of flexible and moving parts, and many expensive components, such as electromagnetic motors and gears. They are also difficult and time-consuming to put on compared to other controllers that can easily and quickly be picked up.

To address the problems associated with conventional virtual reality controllers, the present concepts relate to a multi-purpose haptic controller that can be stably grasped using a power grip while enabling fine control of virtual objects using natural motions. The controller can also provide convincing realistic cutaneous-level sensations. The controller may have a rigid design that can enable efficient and cost-effective mass manufacturing.

The controller can sense finger motions and/or forces, and thus enable the user to perform natural dexterous finger-based interaction and exploration of virtual objects. In some implementations, the controller may include a trackpad (also known as a touchpad) that the user can use by sliding her thumb or other fingers freely on a plane to explore and interact with virtual objects. The controller according to the present concepts can enable more precise manipulation of virtual objects at human-scale forces compared to conventional virtual reality controllers. For instance, the user can grasp a virtual object using a tripod-type grip with the thumb and two other fingers. The user can dexterously manipulate the virtual object, for example, by feeling the virtual object's surface or rotating the virtual object. The user can also release her fingers and let go of the virtual object.

The controller can also output compelling haptic sensations to the user's fingers and thereby provide a realistic virtual reality experience. For example, the controller may produce haptic sensations that represent squeezing, shearing, or turning an object. The controller can render a wide range of compelling haptic feedback, including compliance of virtual object materials and the texture of virtual object surfaces, despite its rigid design. The controller can produce compelling haptic sensations without resorting to human-scale forces actuated by multiple motors along multiple degrees-of-freedom.

FIG. 1 illustrates a virtual reality system 100, consistent with some implementations of the present concepts. The virtual reality system 100 may include a base station 102. The base station 102 can include hardware and/or software for generating and executing a virtual reality world, including receiving and processing inputs from a user 104, and generating and outputting feedback to the user 104. The base station 102 may be any computing device, including a personal computer (PC), server, gaming console, smartphone, tablet, notebook, automobile, simulator, etc.

In some implementations, the virtual reality system 100 can include a headset 106. The headset 106 may be, for example, a head-mounted display (HMD) that receives visual information from the virtual reality world being executed by the base station 102 and includes a display for displaying the visual information to the user 104. The user 104 may wear the headset 106 on her head. The headset 106 may also receive auditory information associated with the virtual reality world from the base station 102 and include speakers to render the auditory information to the user 104. In some implementations, the headset 106 may include one or more sensors (not shown in FIG. 1) for providing inputs to the base station 102. The sensors may include, for example, buttons, accelerometers, gyroscopes, cameras, microphones, etc. The headset 106, therefore, may be capable of detecting objects in the user's surrounding, the position of the user's head, the direction the user's head is facing, whether the user's eyes are opened or closed, which direction the user's eyes are looking, etc.

The virtual reality system 100 may further include a controller 108. Consistent with the present concepts, the controller 108 may be a handheld device that the user 104 can hold in her hand 110 and manipulate with her fingers to provide inputs to the base station 102. The controller 108 may include sensors 112 capable of detecting finger motions and/or forces. Example sensors 112 are introduced in connection with FIGS. 3A-3E. Furthermore, the controller 108 may receive haptic information from the virtual reality world being executed by the base station 102 and can render the haptic information to the user's hand 110 via vibrators 114. Example vibrators 114 are introduced in connection with FIGS. 3A-3E.

The virtual reality system 100 described in connection with FIG. 1 is just an example. Various configurations of the virtual reality system 100 are possible. The base station 102 may communicate with the headset 106 and/or the controller 108 via wire and/or wirelessly. In some implementations, the base station 102 may be included in the headset 106 or in the controller 108. The display can be a television, monitor, screen, projector, goggles, glasses, lenses, etc. The speakers can be external standalone speakers, build-in speakers of a computing device, headphones, earphones, etc. Moreover, although the controller 108 is illustrated in FIG. 1 as a standalone device, it may be an addition to another peripheral device.

Figure 2A:
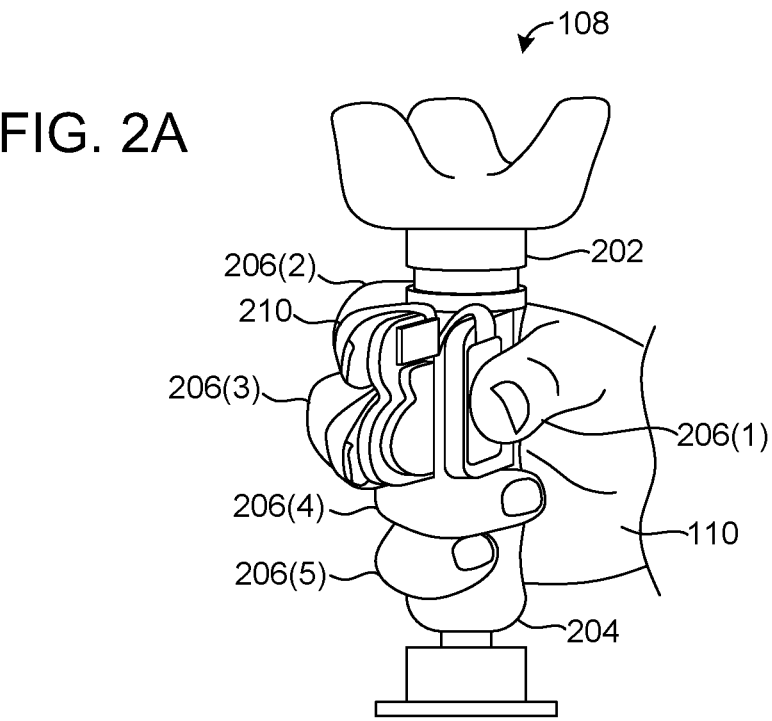
FIGS. 2A and 2B illustrate different perspective views of a controller, consistent with some implementations of the present concepts.
Figure 2B:
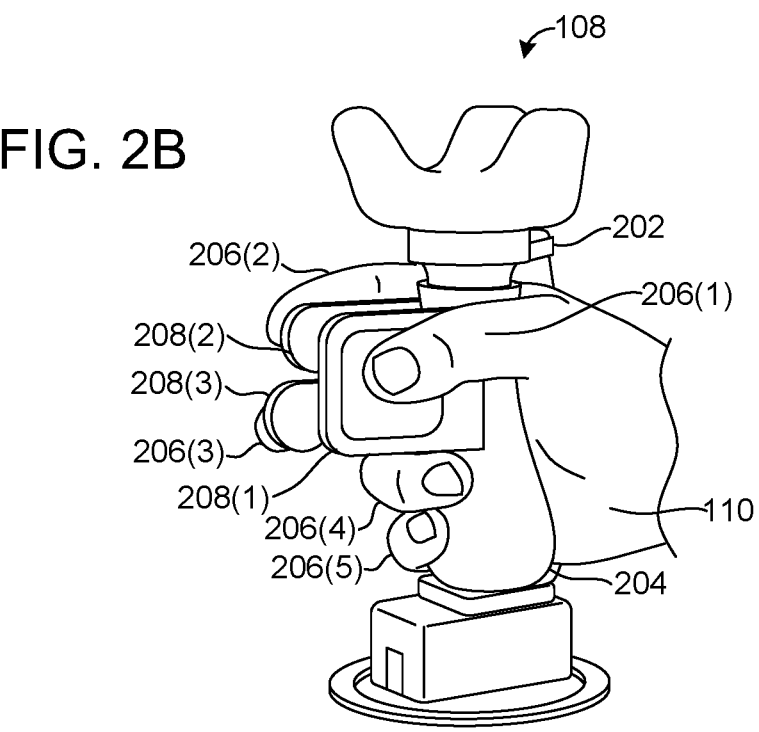

FIGS. 2A and 2B illustrate different perspective views of the controller 108, consistent with some implementations of the present concepts. FIG. 2A shows a front view of the controller 108 (i.e., viewed from the fingertip end), and FIG. 2B shows a left view of the controller 108 (i.e., viewed from the thumb side). These figures will be described together.

The controller 108 may include a body 202 that provides a structure to which various parts of the controller 108 may be attached and installed. The body 202 may also house various parts of the controller 108. Optionally, the controller 108 may include a handle 204 that allows the user 104 to hold the controller 108 in the user's hand 110. The example controller 108 illustrated and described herein may be designed to be held by the user's right hand 110, but an alternative controller may be designed to be held by the user's left hand, or an ambidextrous controller may be designed. Although the controller 108 illustrated in FIGS. 2A and 2B has the body 202 with a bar shape and the handle 204 that can be gripped with a ring finger 206(4) and a pinky finger 206(5), other design configurations are possible. For example, the controller 108 may include a body that has a convex shape like the surface of a ball that can fit in the palm of a hand, and may include handles in the form of finger holes like that of a bowling ball. In some implementations, the body 202 and the handle 204 may be one and the same, or have overlapping structures.

The controller 108 may include one or more finger rests 208, where the user 104 may place her fingers 206. For example, the controller 108 may be operated to provide inputs using only one finger 206 or up to all five fingers 206. In the example implementation shown in FIGS. 2A and 2B, the controller 108 can be operated to provide inputs using the thumb 206(1), the index finger 206(2), and/or the middle finger 206(3). Therefore, the controller 108 includes a thumb rest 208(1), an index finger rest 208(2), and a middle finger rest 208(3) that are rigidly attached to the body 202.

According to some implementations, as illustrated in FIG. 2A (the front view), the finger rests 208 may be positioned on the left side and the right side, facing away from each other, such that the user 104 can place her fingers 206 on the outsides of the finger rests 208 and be able to squeeze the finger rests 208 together inwards (e.g., squeeze the thumb and other fingers toward one another). As will be described in more detail below relative to FIGS. 3A-3E, the finger rests 208 can include sensors 112 (not shown in FIGS. 2A and 2B) for sensing information about the user's fingers 206 and include vibrators 114 (not shown in FIGS. 2A and 2B) for providing sensations to the user's fingers 206. The finger rests 208 on opposite sides may be parallel or at an angle with respect to each other (e.g., 30 degrees difference in angle but still substantially facing away from each other). The finger rests 208 on the controller 108 may be used by the user 104 to provide input to the base station 102 to cause virtual fingers to close, for example, to grasp a virtual object.

Optionally, in some implementations, one or more of the finger rests 208 may be attached to restraints 210. The restraints 210 attached to the finger rests 208 may form loops (fully or partially enclosed loops) around the fingers 206 of the user 104 such that the user 104 can pull her fingers 206 away from the finger rests 208 and apply negative forces away from the finger rests 208. The restraints 210 on the controller 108 may be used by the user 104 to provide input to the base station 102 to cause virtual fingers to open, for example, to release a virtual object. Each finger rest 208 may include a restraint 210. Or a subset of the finger rests 208 may include a restraint 210. Two or more finger rests 208 may share a restraint 210.

Consistent with the present concepts, the finger rests 208 may be rigid, non-compliant structures that do not move substantially with respect to the body 202 and with respect one another when the user 104 operates the controller 108 (for example, by squeezing the finger rests 208 together or by pulling the finger rests 208 apart using the restraints 210). Although the finger rests 208 may move miniscule amounts (for example, less than 50 microns) that are detectable by the sensors 112, the finger rests 208 may be perceived as rigid by the user 104. Alternatively, the finger rests 208 may be moveable parts, but their movement may not necessarily provide inputs to the base station 102. For example, the positions and/or the angles of the finger rests 208 may be adjustable to comfortably fit the user's individual hand 110 and fingers 206.

Figure 3A:
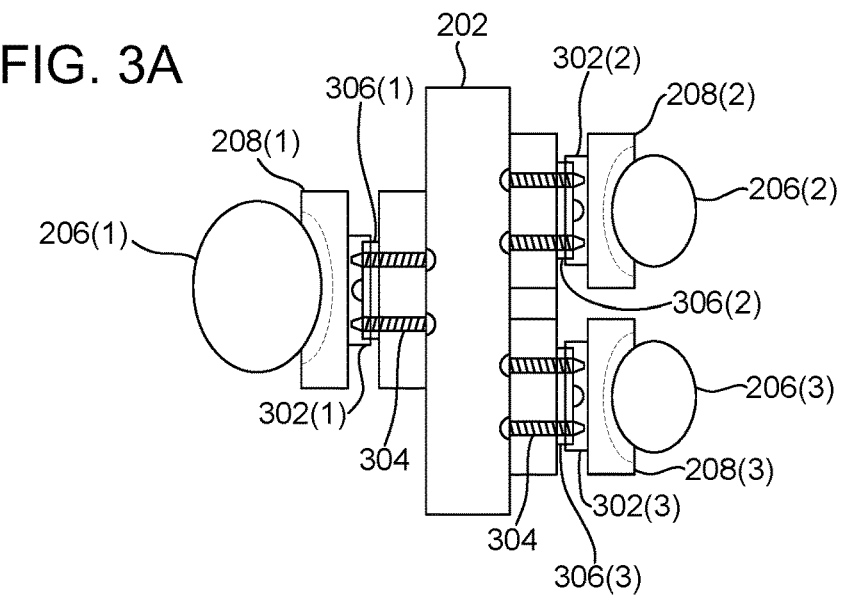
FIGS. 3A through 3E show schematic drawings of the parts of a controller, consistent with some implementations of the present concepts.
Figure 3B:
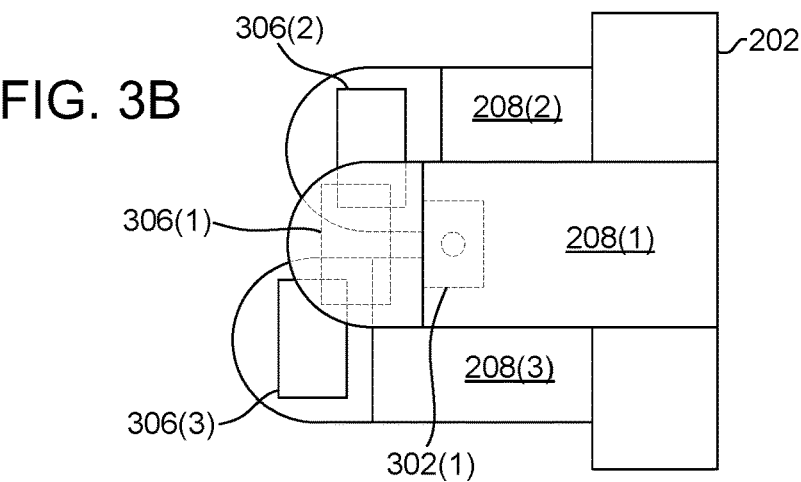
Figure 3C:
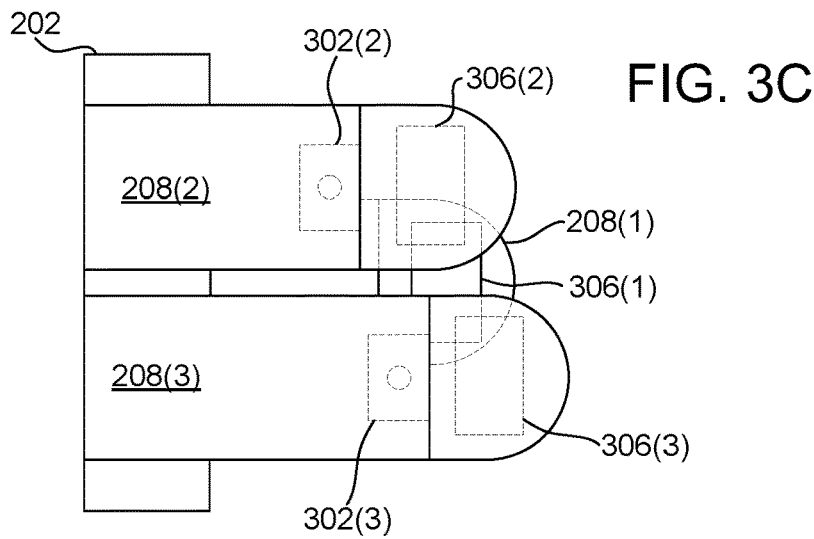
Figure 3D:
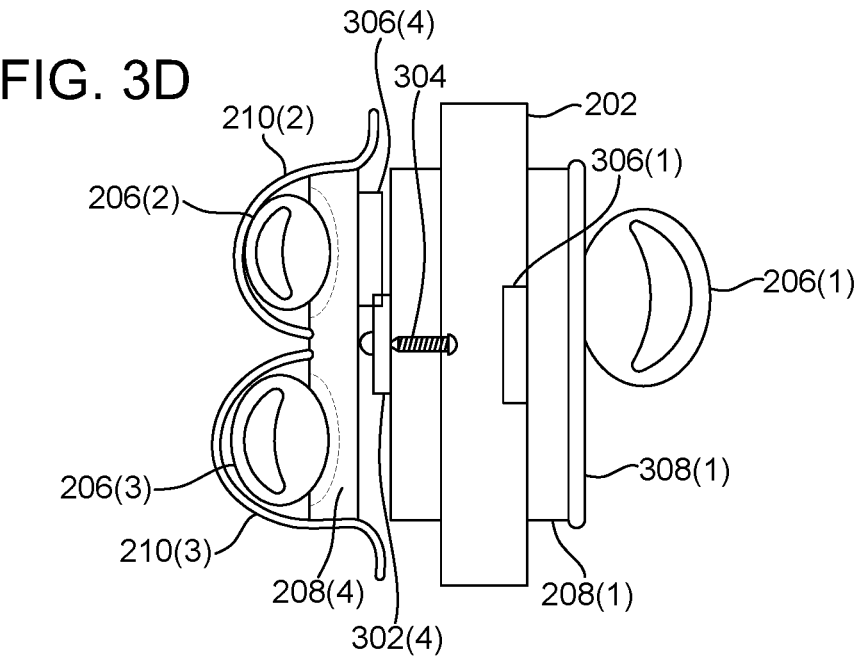
Figure 3E:
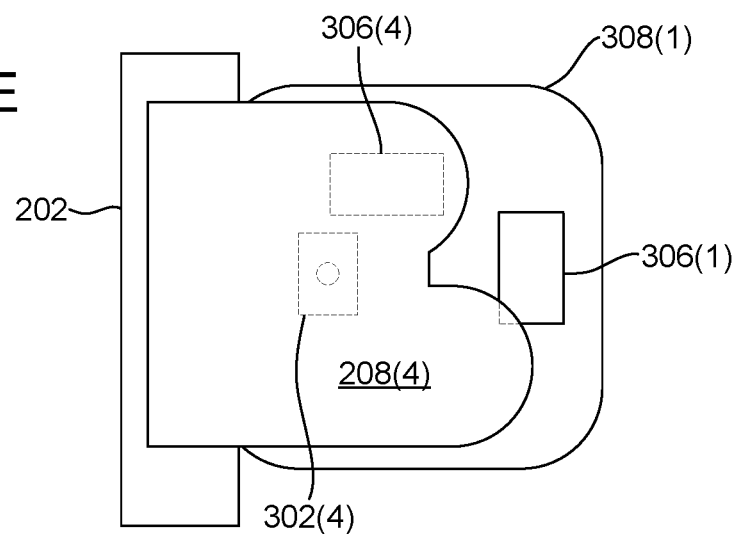

FIGS. 3A through 3E show schematic drawings of the parts of example controller 108, according to various implementations of the present concepts. These figures will be described together. The controller 108 shown in FIGS. 3A through 3E may be configured to be operated by the thumb 206(1), the index finger 206(2), and/or the middle finger 206(3). Thus, the corresponding descriptions will be consistent with this implementation. However, many variations in the configuration of the controller 108 are possible. FIGS. 3A through 3E show the controller 108 from different perspective views and also show various configurations of the controller 108. FIG. 3A shows a rear view of the controller 108, i.e., viewed from the wrist end. FIG. 3B shows a left view of the controller 108, i.e., viewed from the thumb side. FIGS. 3C and 3E show a right view of the controller 108, i.e., viewed from the index and middle finger side. FIG. 3D shows a front view of the controller 108, i.e., viewed from the fingertip end.

The controller 108 includes the body 202, a portion of which is shown in FIGS. 3A-3E. In some implementations, the body 202 may include a support structure portion that protrudes from the main portion of the body 202, such that the support structure portion provides a frame through which other parts of the controller 108 can be attached to the body 202 of the controller 108.

In the configuration shown in FIGS. 3A-3C, the controller 108 may include a thumb rest 208(1) on one side of the body 202 and may include an index finger rest 208(2) and a middle finger rest 208(3) on the other side of the body 202. The thumb rest 208(1) may be faced away from the index finger rest 208(2) and the middle finger rest 208(3), such that the user 104 can squeeze the finger rests 208 towards each other, i.e., towards the body 202 of the controller 108, using her thumb 206(1), index finger 206(2), and middle finger 206(3).

In an alternative configuration shown in FIGS. 3D and 3E, the controller 108 may include a shared finger rest 208(4) that is shared (i.e., operated) by the index finger 206(2) and/or the middle finger 206(3), rather than having a separate index finger rest 208(2) and a separate middle finger rest 208(3).

The finger rests 208 may be rigidly attached to the body 202 either directly or indirectly through other parts of the controller 108. Therefore, the finger rests 208 may not move substantially when squeezed by the user's fingers 206 towards the body 202. Stated another way, the controller does not rely on movement of portions of the controller 108 to achieve the described functionality.

In some configurations, the restraints 210 may be attached to the finger rests 208, such that the user 104 can apply negative forces on the finger rests 208 away from the body 202. As illustrated in FIG. 3D, an index finger restraint 210(2) and a middle finger restraint 210(3) may form two separate loops for the index finger 206(2) and the middle finger 206(3), respectively. Alternatively, one restraint (not shown) may form one larger loop for both the index finger 206(2) and the middle finger 206(3). The restraints 210 may be flexible (e.g., rubber) and/or removable (e.g., Velcro straps). Alternatively, the restraints 210 may be rigid (e.g., plastic). The restraints 210 may be formed tightly, such that the user's fingers 206 are always in contact with the finger rests 208, or the restraints 210 may be formed loosely, such that the user's fingers 206 can be lifted off the finger rests 208 even when the user's fingers 206 are enclosed by the restraints 210.

Consistent with some implementations of the present concepts, the controller 108 may include various sensors 112 that are capable of sensing information about the user's fingers 206, including, for example, the positions of the user's fingers 206 and the amount of force (or pressure) exerted by the user's fingers 206. For instance, the controller 108 may include one or more force sensors 302. The force sensors 302 may be positioned under the finger rests 208 in order to detect and measure the amount of force applied by the user's fingers 206 on the finger rests 208. In one implementation, the force sensors 302 may be capable of sensing up to 1.5 kilogram-force (kgf). The force sensors 302 may be configured to push on the finger rests 208, thus adding stiffness to the finger rests 208. Accordingly, the force sensing range may be approximately doubled to 3 kgf for the full movement range of the force sensors 302 (e.g., 30 microns). In some configurations, one force sensor 302 may detect a force applied by one finger 206. In alternative configurations, multiple force sensors 302 may be installed under each finger rest 208, which can enable additional ways of manipulating virtual objects, such as seesawing a virtual pencil using a virtual thumb and two other virtual fingers. In other configurations, one force sensor 302 may detect forces applied by multiple fingers 206.

As illustrated in FIGS. 3A-3C, the controller 108 may include a thumb force sensor 302(1) under the thumb rest 208(1), an index finger force sensor 302(2) under the index finger rest 208(2), and a middle finger force sensor 302(3) under the middle finger rest 208(3). Alternatively, as illustrated in FIGS. 3D and 3E, a shared force sensor 302(4) may be installed under the shared finger rest 208(4) to measure the level of force applied by the index finger 206(2) and/or the middle finger 206(3).

In some implementations, the force sensors 302 may be bias adjusted towards the body 202, i.e., in the direction the user's fingers 206 would apply force on the finger rests 208. For example, the force sensors 302 may be mechanically biased using one or more setscrews 304 (as shown in FIGS. 3A and 3D) to be placed about 10% into their force sensing range when no pressure is applied to the finger rests 208. In one implementation, a force sensor 302 may have a force sensing range from 0 newton (N) to 15 N, and it may be biased to be at around 1.5 N when no force is applied to it. Where the additional stiffness of a finger rest 208 is pushing against the force sensor 302, the force sensing range may be 0 N to 30 N, and the force sensor 302 may be biased at around 3 N. Accordingly, the force sensors 302 may be capable of detecting not only forces applied by squeezing the finger rests 208 towards the body 202 but also negative forces applied when pulling the finger rests 208 away from the body 202 by extending the user's fingers 206 using the restraints 210.

Consistent with some implementations, the controller 108 may include position sensors capable of detecting the positions of the user's fingers 206. For example, the controller 108 may include a trackpad 308 (or a touchpad). The trackpad 308 may be installed on top of a finger rest 208 or may be installed in lieu of a finger rest 208. The trackpad 308 can detect the position of a finger 206 and thus track the sliding movement of a finger 206 on the trackpad 308. For example, the trackpad 308 may be capable of detecting approximately 130×130 different positions. The trackpad 308 on the controller 108 may be used by the user 104 to provide input to the base station 102 to cause a virtual finger to move. In some implementations, the trackpad 308 may be a 2-dimensional capacitance-based copper pad. Moreover, the trackpad 308 may be composed of multiple (e.g., 3×3) pads assembled together. In some implementations, a thin sheet of acetal may be added on top of the trackpad 308 to minimize friction with the user's finger 206.

In the configuration illustrated in FIG. 3D, the controller 108 may include a thumb trackpad 308(1) for detecting the touch of the user's thumb 206(1). The trackpads 308 may be rigidly attached to the body 202 either directly or indirectly through other parts of the controller 108. For example, the thumb trackpad 308(1) may be installed on the thumb rest 208(1). In other implementations, the thumb trackpad 308(1) may be installed in lieu of the thumb rest 208(1), and thus acting as a thumb rest 208(1).

Furthermore, the trackpad 308 may also be capable of measuring the amount of force a finger 206 applies on the trackpad 308, in addition to detecting the position of the finger 206 on the trackpad 308. Where the trackpad 308 has this additional capability, a force sensor 302 may be omitted under the trackpad 308. For instance, a thumb force sensor (not shown in FIG. 3D) may be installed under the thumb trackpad 308(1). However, a thumb force sensor may be unnecessary and can be omitted where the thumb trackpad 308(1) is capable of measuring not only the position of the user's thumb 206(1) on the thumb trackpad 308(1) but also the force applied by the user's thumb 206(1) on the thumb trackpad 308(1).

The controller 108 may include various other sensors 112 for detecting the user's fingers 206. For example, in alternative implementations, a mechanical sensor (such as a joystick) may be installed in lieu of a capacitive sensor (such as the trackpad 308). In other implementations, the restraints 210 may include pressure sensors, such as capacitive sensors (not shown), facing the backs of the user's fingers 206 so that the pressure sensors can detect when the fingers 206 are lifted away from the finger rests 208 and are touching the pressure sensors.

Consistent with some implementations of the present concepts, the controller 108 may include one or more vibrators 114, such as actuators 306. For example, the actuators 306 may be voice coil actuators (VCAs) that can provide wide-band vibrotactile actuation forces with respect to the inertial mass of the VCAs. (Although the controller 108 has been described as not including moving parts, the actuators 306 move or vibrate very slightly.) The actuators 306 can play sounds (not human-audible sounds but rather vibrations within the audio spectrum) that provide haptic feedback. For example, a VCA may include a 9 mm diameter voice coil and be capable of generating 55 to 75 decibels of sound pressure level (dbSPL). The actuators 306 can thus provide a kinesthetic perception, including force and proprioception. The vibrators 114 can be any other kind of haptic output mechanisms.

The actuators 306 may be positioned under the finger rests 208 and/or the trackpads 308 to provide haptic sensations to the user's fingers 206 touching the finger rests 208 and/or the trackpads 308. In the configuration shown in FIGS. 3A-3C, the controller 108 may include a thumb actuator 306(1) under the thumb rest 208(1), an index finger actuator 306(2) under the index finger rest 208(2), and a middle finger actuator 306(3) under the middle finger rest 208(3) to provide haptic sensations to the user's fingers 206. In the configuration shown in FIGS. 3D and 3E, the thumb actuator 306(1) can be positioned under the thumb trackpad 308(1) to provide haptic sensations to the user's thumb 206(1), and a shared finger actuator 306(4) can be positioned under the shared finger rest 208(4) to provide haptic sensations to both the index finger 206(2) and the middle finger 206(3). In some implementations, a combination of multiple actuators 306 can be used to make illusions of inertia and virtual movements between the actuators 306. The actuators 306 can provide a variety of haptic feedback, while maintaining the cost of the controller 108 relatively inexpensive.

Figure 4A:
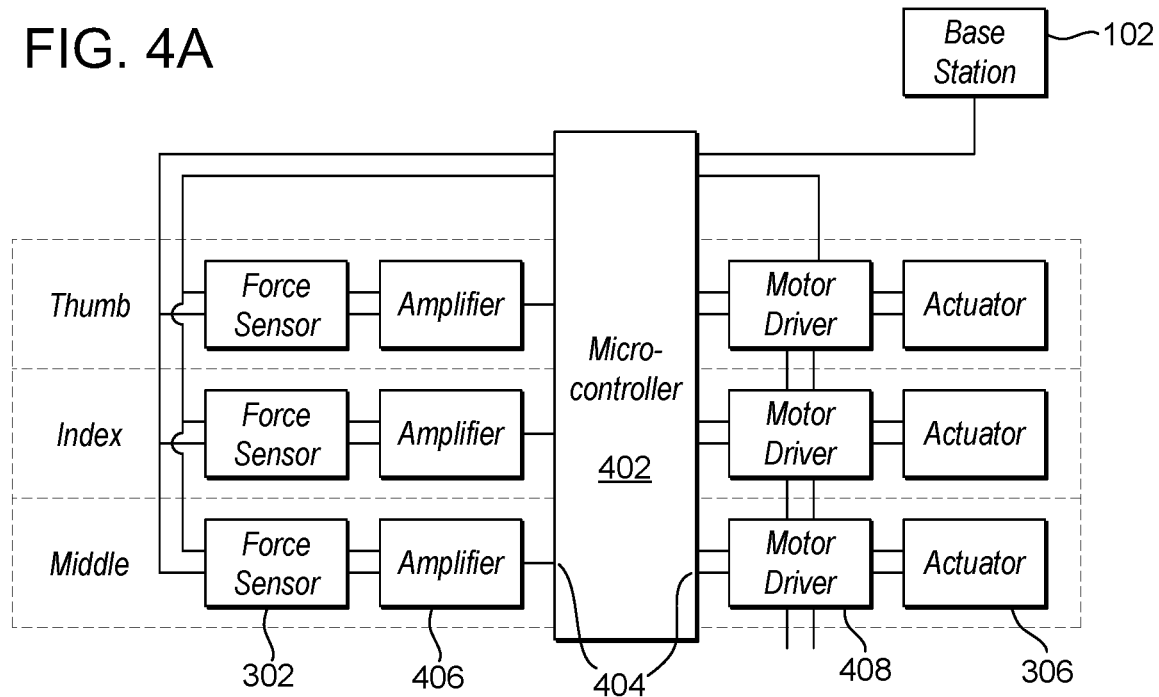
FIGS. 4A and 4B show block diagrams of the components of a controller, consistent with some implementations of the present concepts.
Figure 4B:
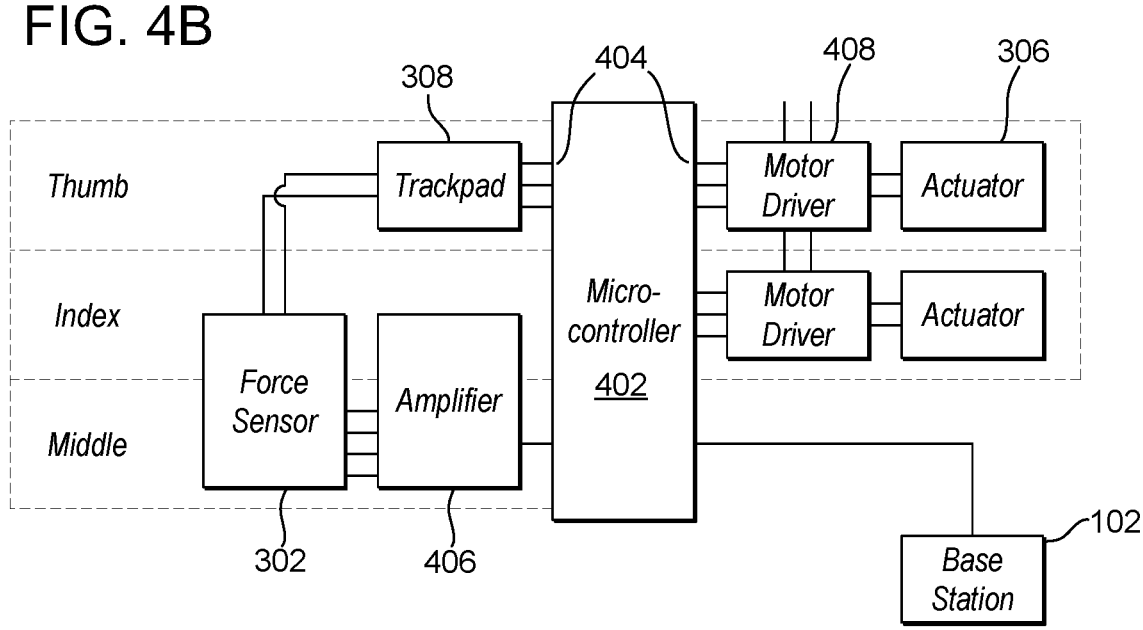

FIGS. 4A and 4B show block diagrams of the components of the controller 108, consistent with some implementations of the present concepts. The block diagram in FIG. 4A may correspond to the configuration of the controller 108 shown in FIGS. 3A-3C, and the block diagram in FIG. 4B may correspond to the configuration of the controller 108 shown in FIGS. 3D and 3E.

Consistent with some implementations of the present concepts, the controller 108 may include a processor, such as a microcontroller 402. The microcontroller 402 may have one or more pins 404 for receiving input signals and transmitting output signals. Consistent with the present concepts, the microcontroller 402 may receive signals from the force sensors 302. The signals from force sensor 302 may include a measurement of the level of force applied on the corresponding finger rest 208. In some implementations, the signals from the force sensors 302 may be amplified by amplifiers 406 and then routed to analog-to-digital conversion (ADC) pins 404 of the microcontroller 402.

In some implementations, the microcontroller 402 may receive signals from one or more trackpads 308. For example, where the trackpad 308 is composed of nine (3×3) pads, the nine pads may be wired to nine pins 404 of the microcontroller 402. The signals from the trackpad 308 may include a position of a finger 206 touching the trackpad 308. The signals may also include a measurement of the force applied by the finger 206 on the trackpad 308.

Consistent with the present concepts, the microcontroller 402 may generate an input signal based on the signals received from one or more force sensors 302 (or from the amplifiers 406) and/or signals received from the one or more trackpads 308. The microcontroller 402 may transmit the input signal to the base station 102. In some implementations, the input signal may include raw signal outputs from the sensors (e.g., the force sensors 302 and the trackpads 308), such as x-coordinate and y-coordinate positions provided by the trackpads 308 that indicate the sensed positions of the user's fingers 206, capacitance levels provided by the trackpads 308 depending on how strongly the user's fingers 206 are pressing on the trackpads 308, and/or force levels provided by the force sensors 302 depending on how strongly the user's finger 206 are pressing or pulling on the finger rests 208. In alternative implementations, the input signal may include interpreted data signals that conform to a protocol understood by the controller 108 and the base station 102, and convey logical representations of the user's finger motions and forces.

Consistent with the present concepts, the microcontroller 402 may receive an output signal from the base station 102. The microcontroller 402 may generate control signals based on the output signal received from the base station 102, and may transmit the control signals via pulse-width modulation (PWM) pins 404 to drive the actuators 306. The control signals from the microcontroller 402 may be amplified by motor drivers 408, for example, using a full bridge with an external drive voltage. In some implementations, the output signal may include signal parameters (e.g., amplitudes, frequencies, and durations) of haptic vibrations to be rendered by one or more actuators 306 in the controller 108. Alternatively, the output signal may include logical commands that the controller 108 understands (e.g., via a lookup table stored in the microcontroller 402 that maps the commands to certain ways of driving the actuators 306).

The components of the controller 108 described in connection with FIGS. 4A and 4B are merely examples and are not exhaustive. The controller 108 may include many other components. For example, the controller 108 may include an internal power source, such as a battery, or an external power source. The controller 108 may include a wireless transceiver, buttons, display lights, etc.

FIG. 5 shows block diagrams of example configurations of the virtual reality system 100, consistent with some implementations of the present concepts. The virtual reality system 100 may include the base station 102 that communicates via wire and/or wirelessly with one or more peripheral devices 502. For instance, the base station 102 may communicate with the peripheral devices 502 through a network 504 via wired and/or wireless protocols. In the example illustrated in FIG. 5, the base station 102 may be a server computing device. The number of devices and the type of devices described and depicted are intended to be illustrative and non-limiting. The base station 102 can include other types of computing devices, such as personal computers, desktop computers, notebook computers, cell phones, smart phones, personal digital assistants, pad type computers, mobile computers, wearable devices, cameras, appliances, smart devices, IoT devices, vehicles, etc., and/or any of a myriad of ever-evolving or yet-to-be-developed types of computing devices. The term "device," "computer," or "computing device" as used herein can mean any type of device that has some amount of processing capability and/or storage capability. Processing capability can be provided by one or more hardware processors 508 that can execute data in the form of computer-readable instructions to provide a functionality. Data, such as computer-readable instructions and/or user-related data, can be stored on storage 510, such as storage that can be internal or external to the device. The storage 510 can include any one or more of volatile or non-volatile memory, hard drives, flash storage devices, and/or optical storage devices (e.g., CDs, DVDs etc.), remote storage (e.g., cloud-based storage), among others. As used herein, the term "computer-readable media" can include transitory propagating signals. In contrast, the term "computer-readable storage media" excludes transitory propagating signals. Computer-readable storage media include "computer-readable storage devices." Examples of computer-readable storage devices include volatile storage media, such as RAM, and non-volatile storage media, such as hard drives, optical discs, and flash memory, among others.

Consistent with the present concepts, the base station 102 may include a virtual reality module 512 that provides a virtual reality (including augmented reality or mixed reality) experience to the user 104. For example, the virtual reality module 512 may include software and use hardware resources to perform computer processing for creating and maintaining a simulated environment, including virtual worlds and virtual objects; generating visual, auditory, and/or haptic feedback; and processing input signals from the user 104.

Consistent with the present concepts, the base station 102 may operate in conjunction with one or more of the peripheral devices 502 to provide a virtual reality experience. For example, the peripheral devices 502 may include a display 514 that can render visual feedback to the user 104 based on signals from the base station 102. The peripheral devices 502 may also include a speaker 516 that can render auditory feedback to the user 104 based on signals from the base station 102. The peripheral devices may include the controller 108 that can render haptic feedback (such as kinesthetic and cutaneous feedback) to the user 104 based on signals from the base station 102.

Furthermore, the controller 108 may provide finger movement information to the base station 102. The peripheral devices 502 may include a camera 518 that can provide visual information to the base station 102. The peripheral devices 502 may also include a microphone 520 that can provide auditory information to the base station 102.

The peripheral devices 502 may include wearable devices, such as glasses 522 and a headset 106. These wearable devices may include one or more of a display, a speaker, a microphone, and a camera.

FIG. 5 shows two example device configurations 524(1) and 524(2) that can be employed by the base station 102. The base station 102 can employ either of the configurations 524(1) or 524(2), or an alternate configuration. One instance of each configuration 524 is illustrated in FIG. 5. The device configuration 524(1) may represent an operating system (OS) centric configuration. The device configuration 524(1) can be organized into one or more applications 526, operating system 528, and hardware 530. The device configuration 524(2) may represent a system-on-chip (SOC) configuration. The device configuration 524(2) may be organized into shared resources 532, dedicated resources 534, and an interface 536 therebetween.

In either configuration 524(1) or 524(2), the base station 102 can include storage/memory 510 and a processor 508. The term "processor" as used herein can also refer to hardware processors, such as central processing units (CPUs), graphical processing units (GPUs), controllers, microcontrollers, field-programmable gate arrays (FPGAs), application-specific integrated circuits (ASICs), processor cores, or other types of processing devices. The base station 102 may also include other components that are not illustrated in FIG. 5, such as a battery (or other power source), a network communication component, and/or input-output components.

In the case of the device configuration 524(2), certain functionality provided by the base station 102 can be integrated on a single SOC or multiple coupled SOCs. One or more processors 508 can be configured to coordinate with shared resources 532, such as storage/memory 510, etc., and/or one or more dedicated resources 534, such as hardware blocks configured to perform specific functions. For example, certain functionalities of the virtual reality module 512 may be optimized and implemented on an FPGA.

FIGS. 6A through 6E illustrate virtual renderings of manipulating a virtual object 602, consistent with some implementations of the present concepts. For instance, these virtual scenes may be generated by the base station 102 using inverse kinematics based on input signals from the controller 108 and transmitted by the base station 102 to the display 514 to be shown to the user 104.

Figure 6A:
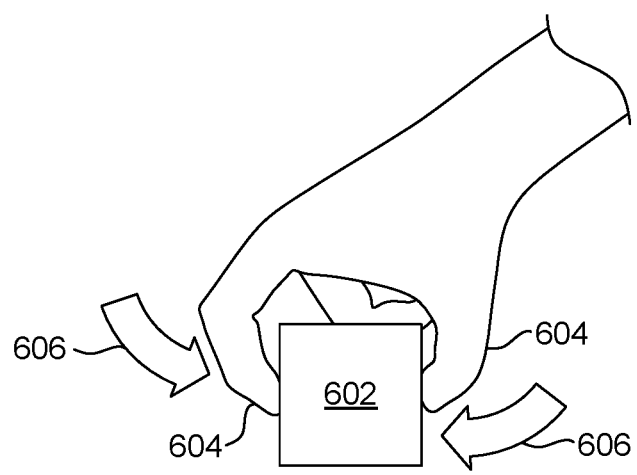

FIG. 6A shows virtual fingers 604 grasping the virtual object 602. This visual information may have been generated by the base station 102 based on input signals received from the controller 108 in response to the user 104 squeezing the finger rests 208 and/or the trackpads 308 using her fingers 206. The base station 102 may use collision dynamics to calculate a contact point between a virtual finger 604 and the virtual object 602, for example, by originating a ray at the tip of the virtual finger 604 in the direction orthogonal to the corresponding finger rest 208 or trackpad 308, and determining an intersection between the ray and the virtual object 602. These calculations may be performed for each virtual finger 604 that has force applied to its corresponding finger rest 208 or trackpad 308.

The base station 102 may declare an acquisition of the virtual object 602 by the virtual fingers 604 when, for example, at least two rays emanating from the virtual fingers 604 in substantially opposite directions intersect the virtual object 602 from opposite sides of the virtual object 602 within a certain threshold distance tolerance (e.g., 1 cm) from the surfaces of the virtual object 602. Furthermore, the position and angles of the joints of the virtual fingers 604 may be estimated using inverse kinematics. Once the virtual object 602 has been grasped and acquired, the virtual object 602 may follow the hand motion in the virtual world.

The base station 102 may generate visual information that simulates the virtual fingers 604 moving in the direction of the arrows 606 shown in FIG. 6A and grasping the virtual object 602. This visual information may be transmitted by the base station 102 to the display 514 and rendered to the user 104. The rigidity of the finger rests 208, which can provide resistance pressure against the user's fingers 206 that are squeezing the finger rests 208, combined with the contemporaneous visual feedback showing the virtual fingers 604 grasping the virtual object 602 can provide a convincing experience for the user 104.

Optionally, the base station 102 may also generate haptic information that simulates the virtual fingers 604 grasping the virtual object 602. In some implementations, the characteristics of the haptic information, including amplitude, frequency, and/or duration, may depend on several factors, such as the level of force applied by the fingers 206 on the finger rests 208 and the virtual size, shape, weight, texture, structure, material, and/or orientation of the virtual object 602. For example, in a scenario where the virtual object 602 is a potato chip, if the user's fingers 206 apply gentle forces on the finger rests 208 when handling the virtual potato chip, then the base station 102 may generate little to no haptic feedback. But if the user's fingers 206 squeeze the finger rests 208 too hard, then the base station 102 may simulate the virtual potato chip cracking or breaking, and generate high-frequency vibrations as haptic feedback, thus rendering a crisp sensation to the user's fingers 206. The haptic information may be transmitted by the base station 102 to the controller 108 and rendered to the user's fingers 206 via the actuators 306. Although the user's fingers 206 do not substantially move the rigid finger rests 208, the combination of contemporaneous visual feedback and haptic feedback may create compelling realistic experience for the user 104. For example, the user 104 may perceive a compression of the virtual object 602 even though the finger rests 208 are rigid and do not move. Furthermore, the mind of the user 104 may interpret the vibrations produced by the actuators 306 as cracking of the virtual object materials under pressure.

FIG. 6B shows virtual fingers 604 releasing the virtual object 602. This visual information may have been generated by the base station 102 based on input signals received from the controller 108 in response to the user 104 releasing her fingers 206 off the finger rests 208 and/or the trackpads 308. The base station 102 may declare the release of the virtual object 602 by the virtual fingers 604 based on several factors. For example, the base station 102 may declare the release of the virtual object 602 when the force applied by the user's fingers 206 on the finger rests 208 and/or trackpads 308 is negative, i.e., the user's fingers 206 are applying negative forces on the finger rests 208 and/or trackpads 308 using the restraints 210. Or, the release may be declared when the user's fingers 206 apply zero force on the finger rests 208 and/or trackpads 308. Alternatively, the release may be declared when the user's fingers 206 are applying a small positive force on the finger rests 208 and/or trackpads 308. The different scenarios for declaring a release may be dependent on, for example, the shape of the virtual object 602, the virtual weight of the virtual object 602, the angles at which the virtual fingers 604 are grasping the virtual object 602, the virtual texture (smooth or rough) of the virtual object 602, whether the virtual object 602 is resting on a virtual surface or being held up in the air when being released by the virtual fingers 604, etc. In some implementations, the base station 102 may not declare a release of the virtual object 602 while the virtual hand (and the virtual fingers 604) are holding up the virtual object 602 from the bottom as shown in FIG. 6C.

The base station 102 may generate visual information that simulates the virtual fingers 604 moving away from the virtual object 602 in the direction of the arrows 608 shown in FIG. 6B and releasing the virtual object 602. If the virtual object 602 is not already resting on a virtual surface, the base station 102 may simulate the virtual object 602 falling, spinning, hitting a virtual surface, tumbling, etc., according to the virtual world scenario. This visual information may be transmitted by the base station 102 to the display 514 and rendered to the user 104. Realistic experience may be provided to the user 104, who pulled her fingers 206 off the finger rests 208, by contemporaneously showing the virtual fingers 604 opening and thereby releasing the virtual object 602.

Optionally, the base station 102 may also generate haptic information that simulates the virtual fingers 604 releasing the virtual object 602. For example, in a scenario where the virtual object 602 is a rough piece of wood, the base station 102 may simulate the rough texture of the virtual object 602 slipping from the grasp of the user's fingers 206 by generating corresponding haptic vibrations at appropriate frequencies to provide a realistic natural experience for the user 104. The haptic information may be transmitted by the base station 102 to the controller 108 and rendered to the user's fingers 206 via the actuators 306.

Figure 6D:
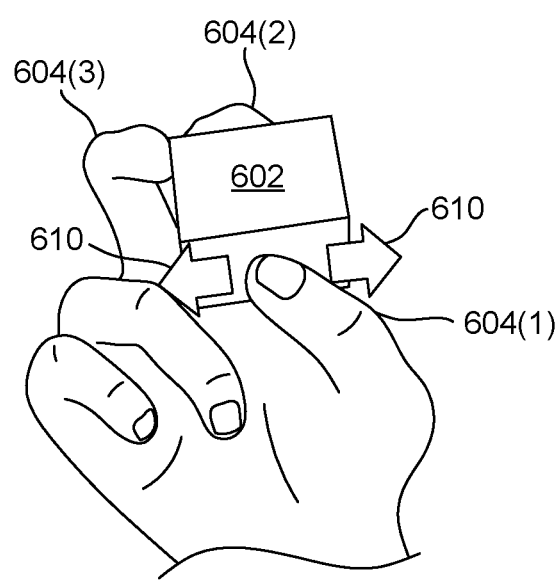

FIG. 6D shows a virtual thumb 604(1) sliding on a surface of the virtual object 602. This visual information may have been generated by the base station 102 based on input signals received from the controller 108 in response to the user 104 moving her thumb 206(1) on the thumb trackpad 308(1). The base station 102 may calculate the direction and speed of the virtual thumb 604(1) moving on the surface of the virtual object 602 based on the input signals from the controller 108.

In some implementations, the base station 102 may compare the force applied by the user's thumb 206(1) on the thumb trackpad 308(1) with a certain threshold to determine whether the user 104 wishes to slide the virtual thumb 604(1) along the surface of the virtual object 602 (e.g., to feel the surface texture of the virtual object 602) or to rotate the virtual object 602. That is, the user 104 can slide the virtual thumb 604(1) on the surface of the virtual object 602 by applying a relatively small force on the trackpad 308 while sliding her thumb 206(1) across it, or the user 104 can rotate the virtual object 602 by applying a relatively large force on the trackpad 308 while sliding her thumb 206(1) across it. For example, in one implementation, the threshold value may be set to 15 N, which may be the maximum force detectable by the trackpad 308 (or by a force sensor 302 underneath the trackpad 308, or set to 13.5 N where the force sensor 302 is bias adjusted at 1.5 N). In this example, the base station 102 may slide the virtual thumb 604(1) on the surface of the virtual object 602 if less than 15 N is detected while the user's thumb 206(1) slides across the trackpad 308, or the base station 102 may rotate the virtual object 602 if at least 15 N is detected while the user's thumb 206(1) slides across the trackpad 308. Other threshold values are possible.

The base station 102 may generate visual information that simulates the virtual thumb 604(1) sliding along the surface of the virtual object 602 in the direction of the arrow 610 shown in FIG. 6D. This visual information may be transmitted by the base station 102 to the display 514 and rendered to the user 104.

The base station 102 may also generate haptic information that simulates the virtual thumb 604(1) sliding along the surface of the virtual object 602. For example, the haptic information may depend on the material and surface information, including surface texture, of the virtual object 602. The amplitude of the texture feedback may be proportional to the speed of the movement of the thumb 206(1) on the thumb trackpad 308(1). As such, the amplitude of the texture feedback may be zero when the thumb 206(1) stops moving on the thumb trackpad 308(1).

For instance, if the virtual object 602 were a virtual TV remote control and the user 104 were using the controller 108 by sliding her thumb 206(1) across the thumb trackpad 308(1) to simulate a virtual thumb 604(1) sliding across the virtual TV remote control, then the base station 102 may generate appropriate haptic information to simulate the virtual thumb 604(1) sliding across the bumps and dips between the virtual TV remote control buttons and to simulate the textures of soft rubbery buttons and hard smooth plastic body of the virtual TV remote control. For example, when the virtual thumb 604(1) crosses an edge of a virtual button, the base station 102 can generate haptic feedback with a high-amplitude impulse that simulates a bump. The base station 102 can also generate haptic feedback that simulates a texture of rubber and a force-displacement profile of a soft button using known techniques. The haptic information may be transmitted by the base station 102 to the controller 108 and rendered to the user's thumb 206(1) via a thumb actuator 306(1) under the thumb trackpad 308(1).

Figure 6E:
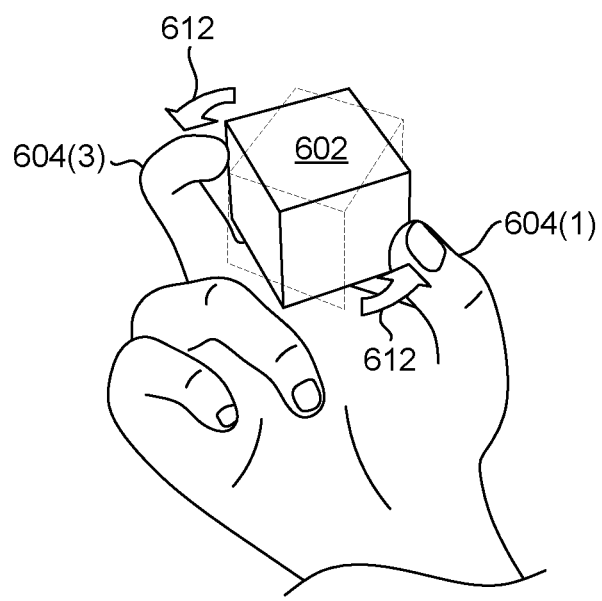

FIG. 6E shows the virtual fingers 604 rotating the virtual object 602. This visual information may have been generated by the base station 102 based on input signals received from the controller 108 in response to the user 104 moving her thumb 206(1) on the thumb trackpad 308(1) while applying a force greater than the threshold discussed above with respect to FIG. 6D. This action may not be consistent with using natural motions to control the virtual fingers 604 and the virtual object 602. For instance, the user's index finger 206(2) and middle finger 206(3) may not move in reality but the corresponding virtual index finger 604(2) and virtual middle finger 604(3) may be visually rendered as rotating. The base station 102 may calculate the direction and speed of the rotation of the virtual object 602 based on the input signals from the controller 108. In some implementations, the rotation of the virtual object 602 may be bounded around a given axis, for example, when the user 104 is rotating a virtual screwdriver or a virtual key inside a virtual lock.

In some implementations, the user 104 may be allowed to lift her finger 206 off the trackpad 308 without releasing the corresponding virtual finger 604 off the virtual object 602 being grasped. For instance, the user 104 may slide her finger 206 on the trackpad 308, lift her finger 206 off the trackpad 308, place her finger 206 back on the trackpad 308 at a different position, and slide her finger 206 again on the trackpad 308, and so on, in order to continue rotating the virtual object 602. (These actions may be similar to a user moving a mouse up to the edge of a mousepad, lifting the mouse off the mousepad, setting the mouse back down on the mousepad at a different position, and moving the mouse on the mousepad again, and so on, in order to move a cursor on a display.) To enable this feature, the base station 102 may receive input signals from the controller 108, indicating that the user 104 has lifted a finger 206 off the trackpad 308, but may not register lifting the corresponding virtual finger 604 off the virtual object 602, as illustrated in FIG. 6C. This may be a scenario considered by the base station 102 when determining whether to release the virtual object 602, as described above in connection with FIG. 6C. For example, the base station 102 may determine that lifting a finger 206 off the trackpad 308 immediately or soon after sliding the finger 206 along the trackpad 308 may indicate that the user 104 wishes to continue rotating the virtual object 602 rather than lifting the corresponding virtual finger 604 off the virtual object 602. In such implementations, the user 104 may release the virtual object 602 by lifting her other fingers 206 (besides the finger 206 being used to slide on the trackpad 308) off their corresponding finger rests 208.

The base station 102 may generate visual information that simulates the virtual fingers 604 rotating the virtual object 602 (i.e., changing the orientation of the virtual object 602) in the direction of the arrows 612 shown in FIG. 6E. This visual information may be transmitted by the base station 102 to the display 514 and rendered to the user 104.

The base station 102 may also generate haptic information that simulates the virtual fingers 604 rotating the virtual object 602. For example, the haptic information may include a pulse of vibration (e.g., 6 ms) at every 5 degrees of rotation (similar to an old radio dial that clicks as it turns). The haptic information may be transmitted by the base station 102 to the controller 108 and rendered to the user's fingers 206.

FIGS. 7-10 show flowcharts illustrating methods involving manipulating virtual objects using a controller and providing haptic sensations via the controller, consistent with some implementations of the present concepts. The acts on the left side of the flowcharts may be performed by a base station, and the acts on the right side of the flowcharts may be performed by the controller.

Figure 7:
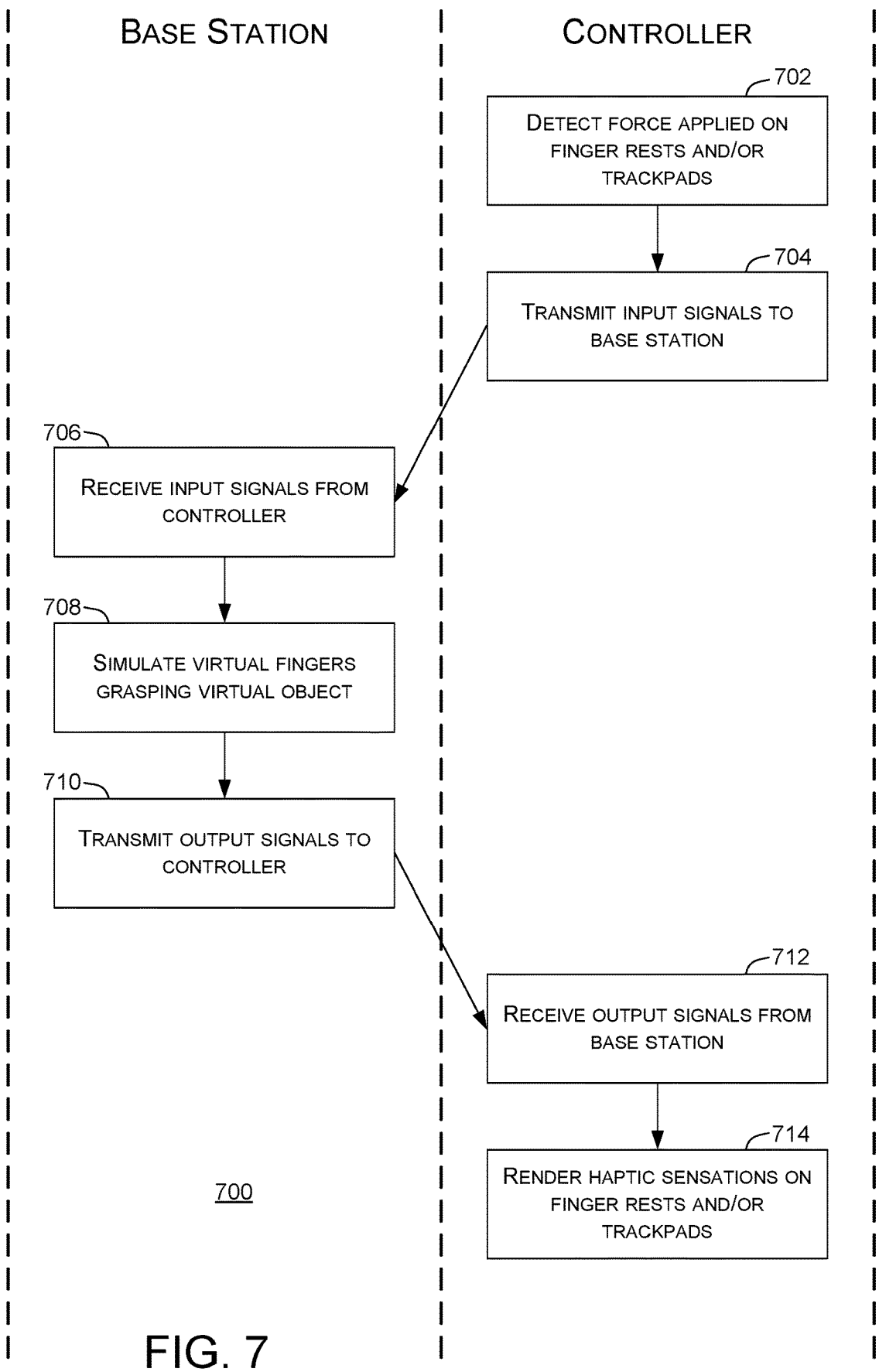
FIG. 7 shows a flowchart illustrating processes involved in grasping a virtual object using a controller, consistent with some implementations of the present concepts.

FIG. 7 shows a flowchart illustrating a grasping method 700. In act 702, the controller detects force applied on one or more finger rests and/or trackpads on the controller by one or more of a user's fingers. For example, the user may use her fingers to squeeze together two or more finger rests that are positioned on opposite sides and facing away from each other on the controller. The user may perform this action in order to grasp a virtual object positioned between virtual fingers that correspond to the finger rests being squeezed.

In act 704, the controller may transmit input signals indicating that the finger rests are being squeezed. For example, the input signals may include information from one or more force sensors, including the identifications of fingers and how much force is being applied to the force sensors under the finger rests. In some implementations, the input signals may include information from one or more trackpads indicating the force (or pressure) with which the user's fingers are pressing on the trackpads. In act 706, the base station may receive the input signals from the controller.

In act 708, the base station can interpret the input signals and apply them to the virtual world. That is, the base station may translate the input signals from the controller (that indicate the positions of the user's fingers and the forces applied by them) into movement of corresponding virtual fingers in the virtual world. In this example, the base station may simulate the virtual fingers moving towards each other, and if there is a virtual object between the virtual fingers, the base station can declare that the virtual fingers are grasping the virtual object.

Furthermore, the base station may generate visual information corresponding to the virtual fingers closing and grasping the virtual object. The visual information may be transmitted by the base station to a display to be rendered to the user.

The base station may also generate haptic information corresponding to the virtual fingers grasping the virtual object. For example, an actuator may render a 6 ms pulse of vibrations at 170 Hz to the appropriate finger rest for every 0.49 N change in the force detected by the corresponding force sensor. In act 710, the base station may transmit output signals corresponding to the haptic information to the controller.

In act 712, the controller may receive the output signals from the base station. In act 714, the controller may drive actuators in the controller to provide haptic sensations on the finger rests and/or trackpads, and thus on the user's fingers.

Figure 8:
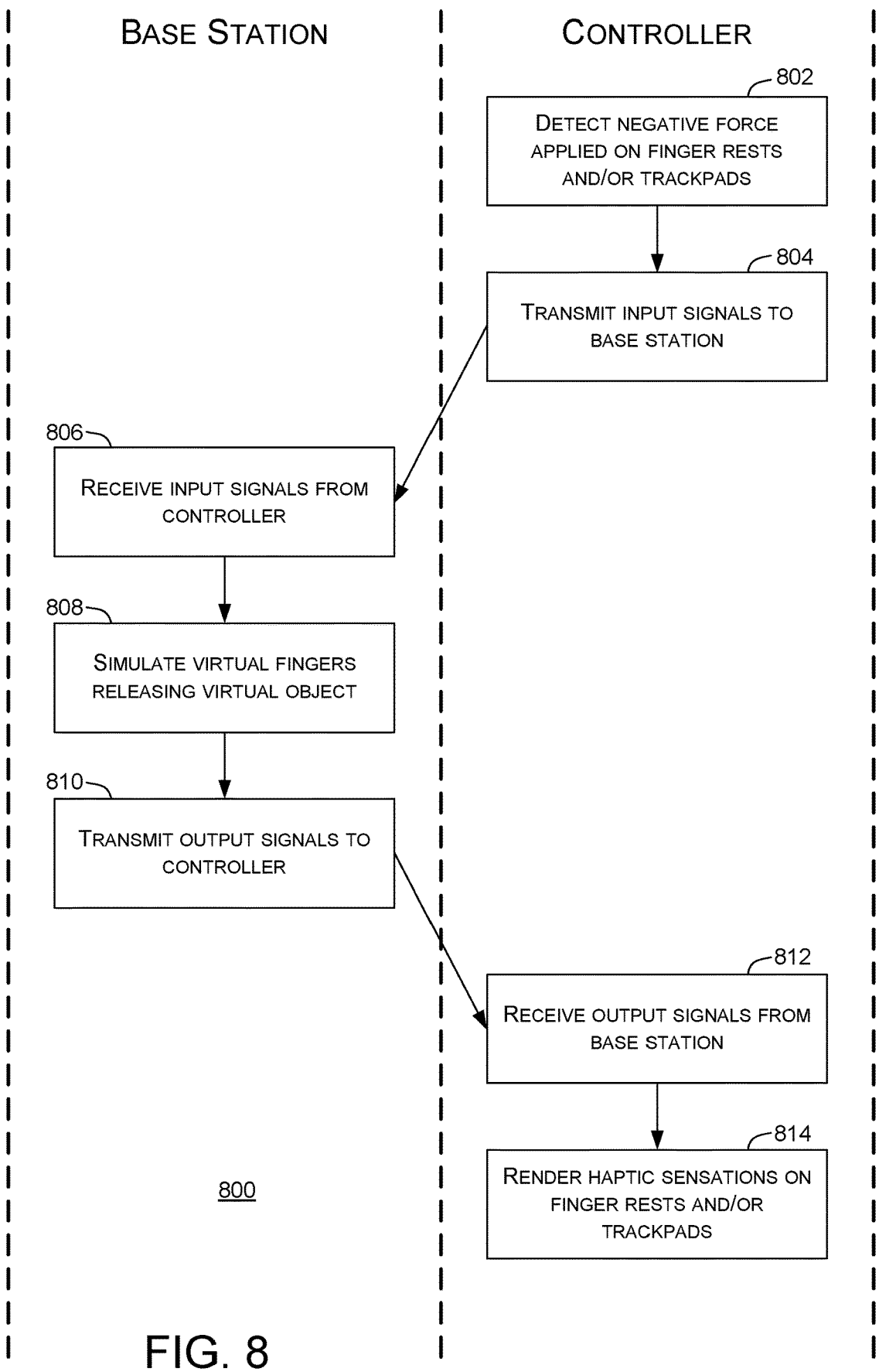
FIG. 8 shows a flowchart illustrating processes involved in releasing a virtual object using a controller, consistent with some implementations of the present concepts.

FIG. 8 shows a flowchart illustrating a releasing method 800. In act 802, the controller detects force applied on one or more finger rests and/or trackpads on the controller by one or more of the user's fingers. The detected force may be a negative force, zero force, or a small positive force on the finger rests and/or trackpads. For example, the user may pull her fingers away from the finger rests. In some implementations, the backs of the user's fingers may push against restraints that are attached to the finger rests and/or trackpads. The user may perform this action in order to release the virtual object that is being grasped by virtual fingers.

In act 804, the controller may transmit input signals indicating that the finger rests are no longer being squeezed. For example, the input signals may include information from one or more force sensors, including the identifications of fingers and how much force is being applied to the force sensors under the finger rests. In some implementations, the input signals may include information from one or more trackpads indicating the force (or pressure), if any, with which the user's fingers are pressing on the trackpads. In act 806, the base station may receive the input signals from the controller.

In act 808, the base station can interpret the input signals and apply them to the virtual world. In this example, the base station may move the virtual fingers away from each other and release the virtual object that was grasped by the virtual fingers. The base station may perform further processing of the virtual world, such as the virtual object being dropped, etc.

The base station may generate visual information corresponding to the virtual fingers releasing the virtual object. The visual information may be transmitted by the base station to a display to be rendered to the user. The base station may further generate auditory information, for example, corresponding to the virtual object dropping and landing on a surface. The auditory information may be transmitted by the base station to a speaker to be rendered to the user.

The base station may also generate haptic information corresponding to the virtual fingers releasing the virtual object. In act 810, the base station may transmit output signals corresponding to the haptic information to the controller.

In act 812, the controller may receive the output signals from the base station. In act 814, the controller may drive the actuators in the controller to provide haptic sensations on the finger rests and/or the trackpads, and thus on the user's fingers.

Figure 9:
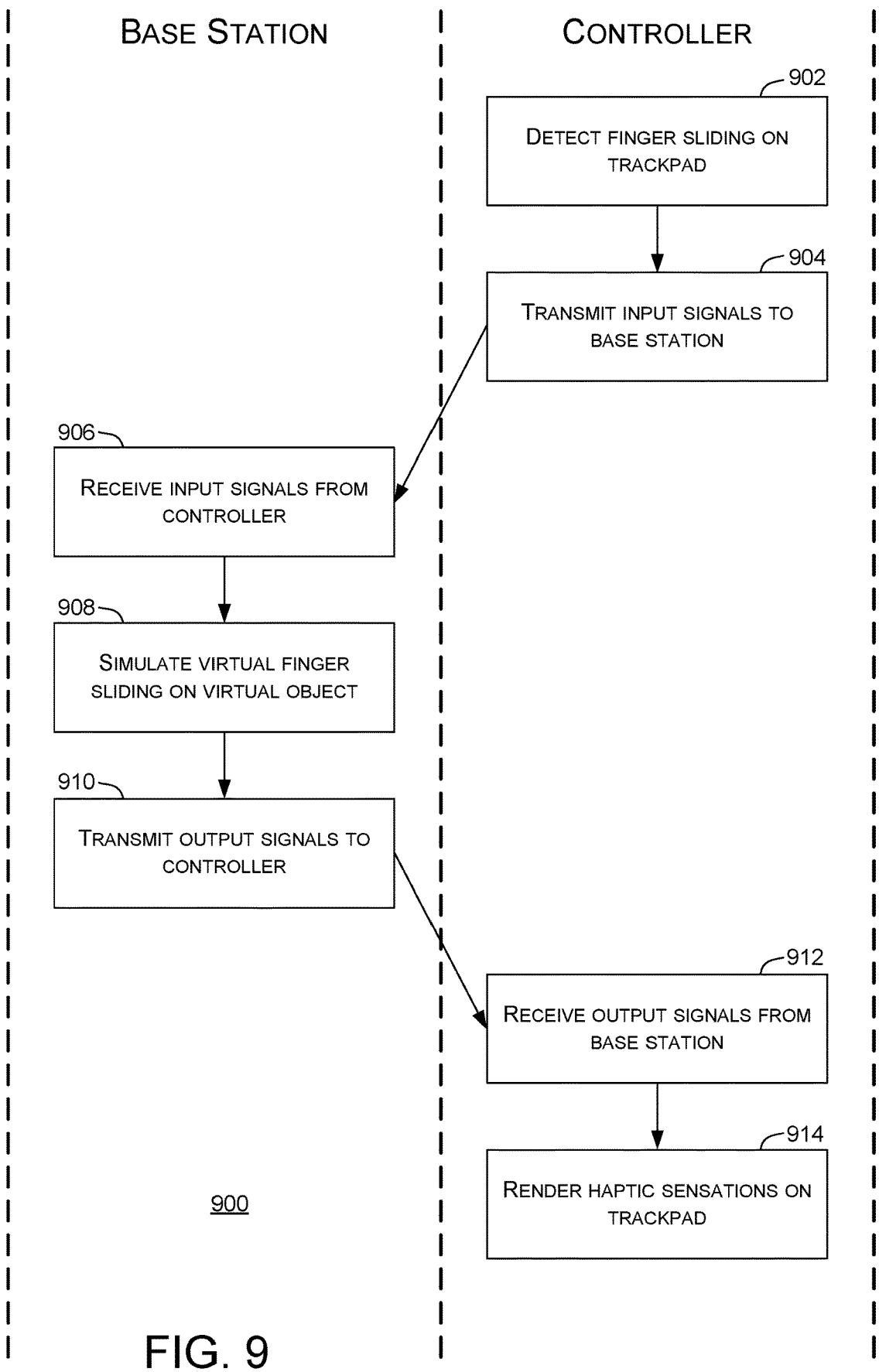
FIG. 9 shows a flowchart illustrating processes involved in sliding a virtual finger on a virtual object surface using a controller, consistent with some implementations of the present concepts.

FIG. 9 shows a flowchart illustrating a sliding method 900. In act 902, the controller detects a finger sliding on a trackpad on the controller. For example, the user may perform this action to move a virtual finger along the surface of a virtual object.

In act 904, the controller may transmit input signals indicating the position of the finger on the trackpad and/or the level of force applied by the finger on the trackpad. Both the position information and the force level information may be provided from the trackpad. Alternatively, the position information may be provided from the trackpad whereas the force level information may be provided from a force sensor underneath the trackpad. In act 906, the base station may receive the input signals from the controller.

In act 908, the base station may interpret the input signals and apply them to the virtual world. In this example, the base station may slide the virtual finger on the virtual object along its surface, if the base station determines that the level of force applied on the trackpad is less than a certain threshold. The virtual finger can be moved in the direction corresponding to the direction of the movement of the user's finger on the trackpad.

Furthermore, the base station may generate visual information corresponding to the virtual finger sliding along the surface of the virtual object. The visual information may be transmitted by the base station to a display to be rendered to the user.

The base station may also generate haptic information corresponding to the virtual finger sliding on the surface of the virtual object. For example, the haptic information may be dependent on the surface texture of the virtual object. In act 910, the base station may transmit output signals corresponding to the haptic information to the controller.

In act 912, the controller may receive the output signals from the base station. In act 914, the controller may drive an actuator in the controller to provide haptic sensations on the trackpad and thus on the user's finger.

Figure 10:
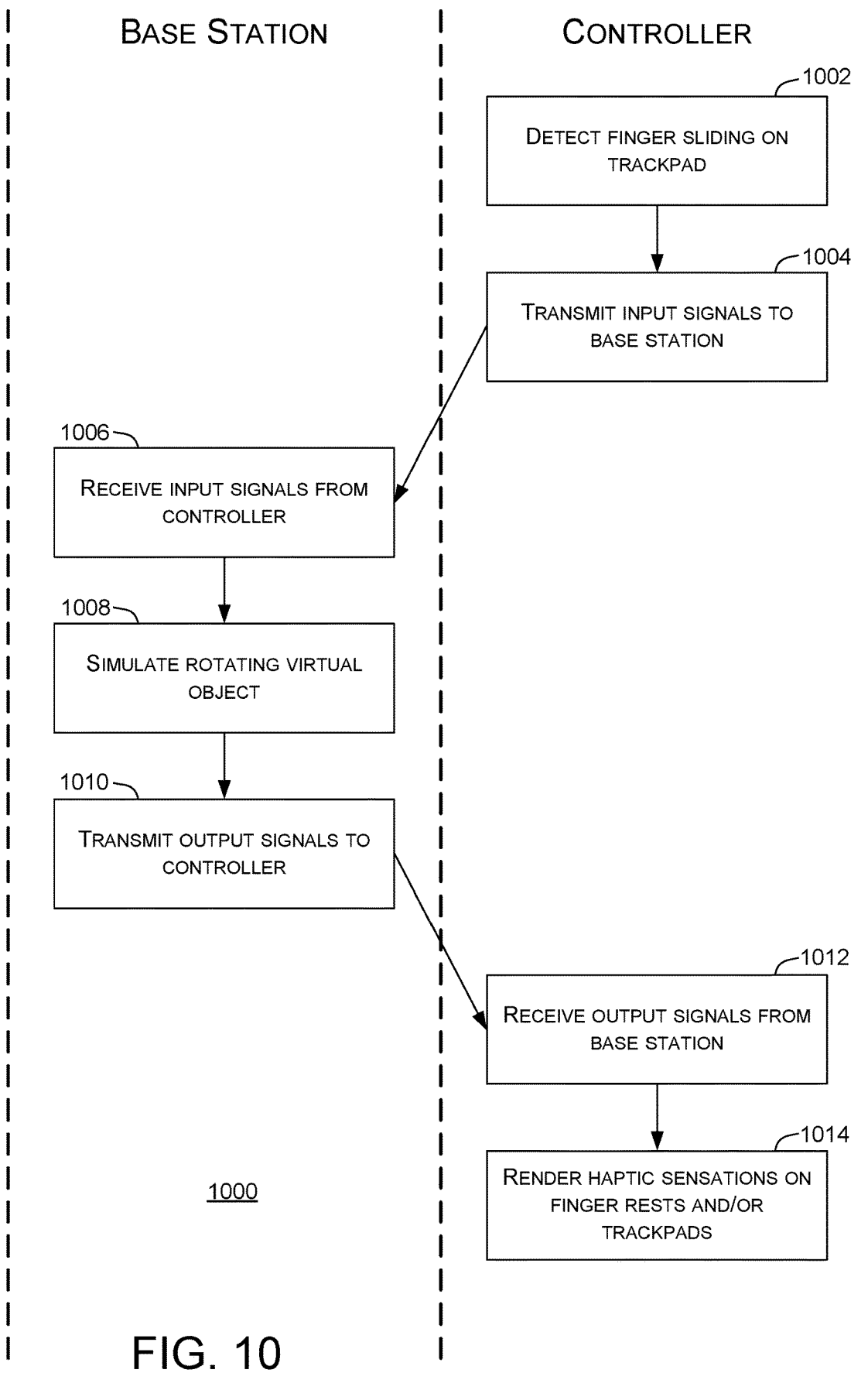
FIG. 10 shows a flowchart illustrating processes involved in rotating a virtual object using a controller, consistent with some implementations of the present concepts.

FIG. 10 shows a flowchart illustrating a rotating method 1000. In act 1002, the controller detects a finger sliding on a trackpad on the controller. For example, the user may perform this action to rotate the virtual object using the virtual fingers.

In act 1004, the controller may transmit input signals indicating the position of the finger on the trackpad and/or the level of force applied by the finger on the trackpad. Both the position information and the force level information may be provided from the trackpad. Alternatively, the position information may be provided from the trackpad whereas the force level information may be provided from a force sensor underneath the trackpad. In act 1006, the base station may receive the input signals from the controller.

In act 1008, the base station may interpret the input signals and apply them to the virtual world. In this example, the base station may rotate the virtual object being grasped by the virtual fingers, if the base station determines that the level of force applied on the trackpad is greater than a certain threshold. The virtual object can be rotated in a direction corresponding to the direction of the movement of the user's finger on the trackpad.

Furthermore, the base station may generate visual information corresponding to the virtual object being rotated by the virtual fingers. The visual information may be transmitted by the base station to a display to be rendered to the user.

The base station may also generate haptic information corresponding to the rotation of the virtual object. In act 1010, the base station may transmit output signals corresponding to the haptic information to the controller.

In act 1012, the controller may receive the output signals from the base station. In act 1014, the controller may drive actuators in the controller to provide haptic sensations on the trackpad and the finger rests and thus provide haptic feedback to the user's fingers.

Various device examples are described above. Additional examples are described below. One example includes a system comprising a controller and a base station including a base station processor configured to: execute a virtual reality world including a virtual object and virtual fingers, receive input signals from the controller, in response to the input signals, manipulate the virtual fingers and/or the virtual object and generate output signals based at least on the manipulation, and transmit the output signals to the controller. The controller includes a thumb rest and at least one finger rest facing away from each other, the thumb rest and the at least one finger rest being substantially rigid, a thumb force sensor positioned under the thumb rest and configured to sense forces applied to the thumb rest, at least one finger force sensor positioned under the at least one finger rest and configured to sense forces applied to the at least one finger rest, a thumb actuator positioned under the thumb rest and configured to provide haptic sensations on the thumb rest, and at least one finger actuator positioned under the at least one finger rest and configured to provide haptic sensations on the at least one finger rest. The controller also includes a controller processor configured to generate the input signals based at least on the forces sensed by the thumb force sensor and/or the at least one finger force sensor, the input signals not being based on movement of the thumb rest and the at least one finger rest, transmit the input signals to the base station, receive the output signals from the base station, and drive the thumb actuator and/or at least one finger actuator based at least on the output signals.

Another example can include any of the above and/or below examples where the controller further includes a trackpad positioned on the thumb rest and the controller processor is configured to generate the input signals further based at least on a position of a thumb on the trackpad.

Another example includes a device comprising finger rests that substantially face away from each other, the finger rests being substantially rigid, one or more force sensors that are positioned under the finger rests, the one or more force sensors being configured to sense forces applied against the finger rests by fingers, a trackpad configured to sense a position of one of the fingers that touches the trackpad, and one or more actuators that are positioned and configured to provide haptic sensations on the finger rests and/or the trackpad. The device also includes a processor configured to generate input signals based at least on forces applied by the fingers on the finger rests and/or the position of the one of the fingers on the trackpad, and drive the actuators based at least on output signals. The device also includes a transceiver configured to transmit the input signals and receive the output signals.

Another example can include any of the above and/or below examples where the device further comprises restraints that are attached to the finger rests, the restraints and the finger rests being configured to form loops around the fingers, wherein the one or more force sensors are mechanically biased, and wherein the one or more force sensors are capable of sensing the fingers pulling on the restraints away from the finger rests.

Another example can include any of the above and/or below examples where the device further comprises a handle for holding the device using at least a palm of a hand.

Another example can include any of the above and/or below examples where at least two of the force sensors are positioned under one of the finger rests.

Another example can include any of the above and/or below examples where one of the actuators provides haptic sensations to at least two fingers.

Another example can include any of the above and/or below examples where at least two of the actuators are positioned under one of the finger rests.

Another example can include any of the above and/or below examples where the trackpad is a capacitance sensor.

Another example includes a method comprising executing a virtual reality world including a virtual object and virtual fingers of a virtual hand, receiving a closing input signal from a controller that includes finger rests facing away from each other, the closing input signal indicating that fingers are applying forces against the finger rests, in response to the closing input signal, generating a grasp haptic output signal that simulates the virtual fingers grasping the virtual object, and transmitting the grasp haptic output signal to the controller, the grasp haptic output signal causing the controller to drive actuators in the controller that generate haptic sensations on the finger rests.

Another example can include any of the above and/or below examples where the method further comprises determining a virtual contact point between one of the virtual fingers and the virtual object by originating a ray at the one of the virtual fingers in a direction that is orthogonal to the corresponding one of the finger rests and calculating an intersection point between the ray and the virtual object.

Another example can include any of the above and/or below examples where the method further comprises declaring a grasp acquisition of the virtual object by the virtual fingers when two or more rays originating from the virtual fingers intersect the virtual object from opposite sides.

Another example can include any of the above and/or below examples where the method further comprises estimating positions of virtual joints of the virtual hand.

Another example can include any of the above and/or below examples where the method further comprises receiving an opening input signal from the controller while the virtual fingers are grasping the virtual object, the controller including restraints attached to the finger rests, the opening input signal indicating that the fingers are applying negative forces away from the finger rests, in response to the opening input signal, generating a releasing visual output signal that simulates the virtual fingers releasing the virtual object, and transmitting the releasing visual output signal to a display.

Another example can include any of the above and/or below examples where the method further comprises receiving a rotating input signal from the controller while the virtual fingers are grasping the virtual object, the controller including a trackpad, the rotating input signal indicating that one of the fingers is sliding on the trackpad with a force above a threshold, in response to the rotating input signal, generating a rotating haptic output signal that simulates the virtual fingers rotating the virtual object, and transmitting the rotating haptic output signal to the controller to generate haptic sensations.

Another example can include any of the above and/or below examples where the method further comprises, in response to the rotating input signal, generating a rotating visual output signal that simulates the virtual fingers rotating the virtual object and transmitting the rotating visual output signal to a display.

Another example can include any of the above and/or below examples where the virtual object is rotated in a direction corresponding to a direction of the sliding of the one of the fingers on the trackpad.

Another example can include any of the above and/or below examples where the method further comprises receiving a lift input signal from the controller while the virtual fingers are grasping the virtual object, the lift input signal indicating that the one of the fingers has lifted off the trackpad, and in response to the lift input signal, keeping one of the virtual fingers that corresponds to the one of the fingers grasping the virtual object.

Another example can include any of the above and/or below examples where the method further comprises receiving a sliding input signal from the controller that includes a trackpad, the sliding input signal indicating that one of the fingers is sliding on the trackpad with a force below a threshold, in response to the sliding input signal, generating a sliding visual output signal and a sliding haptic output signal that simulate one of the virtual fingers corresponding to the one of the fingers sliding on the virtual object, transmitting the sliding visual output signal to a display, and transmitting the sliding haptic output signal to the controller to generate haptic sensations.

Another example can include any of the above and/or below examples where the haptic sensations simulate a surface texture of the virtual object.

Various examples are described above. Although the subject matter has been described in language specific to structural features and/or methodological acts, the subject matter defined in the appended claims is not necessarily limited to the specific features or acts described above. Rather, the specific features and acts described above are presented as example forms of implementing the claims, and other features and acts that would be recognized by one skilled in the art are intended to be within the scope of the claims.

The invention claimed is:

1. A system, comprising:
a controller; and
a base station including a base station processor configured to:
  execute a virtual reality world including a virtual object and virtual fingers;
  receive input signals from the controller;
  in response to the input signals, manipulate the virtual fingers and/or the virtual object and generate output signals based at least on the manipulation; and
  transmit the output signals to the controller;
the controller including:
  a body;
  a thumb rest and at least one finger rest rigidly attached to the body, the thumb rest and the at least one finger rest facing away from each other, the thumb rest and the at least one finger rest being substantially rigid and not substantially moving with respect to the body and with respect to each other when forces are applied on the thumb rest and/or the at least one finger rest to generate the input signals;
  a thumb force sensor positioned under the thumb rest and configured to sense forces applied to the thumb rest;
  at least one finger force sensor positioned under the at least one finger rest and configured to sense forces applied to the at least one finger rest;
  a thumb actuator positioned under the thumb rest and configured to provide haptic sensations on the thumb rest;
  at least one finger actuator positioned under the at least one finger rest and configured to provide haptic sensations on the at least one finger rest; and
  a controller processor configured to:
    generate the input signals based at least on the forces sensed by the thumb force sensor and/or the at least one finger force sensor, the input signals not being based on substantial movement of the thumb rest and the at least one finger rest with respect to the body and with respect to each other;
    transmit the input signals to the base station;
    receive the output signals from the base station; and
    drive the thumb actuator and/or at least one finger actuator based at least on the output signals.

2. The system of claim 1, wherein:
the controller further includes a trackpad positioned on the thumb rest; and
the controller processor is configured to generate the input signals further based at least on a position of a thumb on the trackpad.

3. A device, comprising:
finger rests that substantially face away from each other, the finger rests being substantially rigid and not substantially moving with respect to each other when forces are applied to the finger rests to generate input signals;
one or more force sensors that are positioned under the finger rests, the one or more force sensors being configured to sense forces applied against the finger rests by fingers;
a trackpad configured to sense a position of one of the fingers that touches the trackpad;
one or more actuators that are positioned and configured to provide haptic sensations on the finger rests and/or the trackpad;
a processor configured to:
  generate the input signals based at least on forces applied by the fingers on the finger rests and/or the position of the one of the fingers on the trackpad, the input signal not being based on substantial movement of the finger rests with respect to each other; and
  drive the actuators based at least on output signals; and
a transceiver configured to transmit the input signals and receive the output signals.

4. The device of claim 3, further comprising:
restraints that are attached to the finger rests, the restraints and the finger rests being configured to form loops around the fingers,
wherein the one or more force sensors are mechanically biased, and
wherein the one or more force sensors are capable of sensing the fingers pulling on the restraints away from the finger rests.

5. The device of claim 3, further comprising a handle for holding the device using at least a palm of a hand.

6. The device of claim 3, wherein at least two of the force sensors are positioned under one of the finger rests.

7. The device of claim 3, wherein one of the actuators provides haptic sensations to at least two fingers.

8. The device of claim 3, wherein at least two of the actuators are positioned under one of the finger rests.

9. The device of claim 3, wherein the trackpad is a capacitance sensor.

10. A method, comprising:
executing a virtual reality world including a virtual object and virtual fingers of a virtual hand;
receiving a closing input signal from a controller that includes finger rests facing away from each other, the closing input signal being based on forces applied by fingers against the finger rests and not based on substantial movement of the finger rests with respect to each other in response to forces applied by the fingers;
in response to the closing input signal, generating a grasp haptic output signal that simulates the virtual fingers grasping the virtual object; and
transmitting the grasp haptic output signal to the controller, the grasp haptic output signal causing the controller to drive one or more actuators in the controller that generate haptic sensations on the finger rests.

11. The method of claim 10, further comprising:
determining a virtual contact point between one of the virtual fingers and the virtual object by originating a ray at the one of the virtual fingers in a direction that is orthogonal to the corresponding one of the finger rests and calculating an intersection point between the ray and the virtual object.

12. The method of claim 11, further comprising:
declaring a grasp acquisition of the virtual object by the virtual fingers when two or more rays originating from the virtual fingers intersect the virtual object from opposite sides.

13. The method of claim 10, further comprising:
estimating positions of virtual joints of the virtual hand.

14. The method of claim 10, further comprising:
receiving an opening input signal from the controller while the virtual fingers are grasping the virtual object, the controller including restraints attached to the finger rests, the opening input signal indicating that the fingers are applying negative forces away from the finger rests;
in response to the opening input signal, generating a releasing visual output signal that simulates the virtual fingers releasing the virtual object; and
transmitting the releasing visual output signal to a display.

15. The method of claim 10, further comprising:
receiving a rotating input signal from the controller while the virtual fingers are grasping the virtual object, the controller including a trackpad, the rotating input signal indicating that one of the fingers is sliding on the trackpad with a force above a threshold;
in response to the rotating input signal, generating a rotating haptic output signal that simulates the virtual fingers rotating the virtual object; and
transmitting the rotating haptic output signal to the controller to generate haptic sensations.

16. The method of claim 15, further comprising:
in response to the rotating input signal, generating a rotating visual output signal that simulates the virtual fingers rotating the virtual object; and
transmitting the rotating visual output signal to a display.

17. The method of claim 16, wherein the virtual object is rotated in a direction corresponding to a direction of the sliding of the one of the fingers on the trackpad.

18. The method of claim 15, further comprising:
receiving a lift input signal from the controller while the virtual fingers are grasping the virtual object, the lift input signal indicating that the one of the fingers has lifted off the trackpad; and
in response to the lift input signal, keeping one of the virtual fingers that corresponds to the one of the fingers grasping the virtual object.

19. The method of claim 10, further comprising:
receiving a sliding input signal from the controller that includes a trackpad, the sliding input signal indicating that one of the fingers is sliding on the trackpad with a force below a threshold;
in response to the sliding input signal, generating a sliding visual output signal and a sliding haptic output signal that simulate one of the virtual fingers corresponding to the one of the fingers sliding on the virtual object;
transmitting the sliding visual output signal to a display; and
transmitting the sliding haptic output signal to the controller to generate haptic sensations.

20. The method of claim 19, wherein the haptic sensations simulate a surface texture of the virtual object.

* * * * *